US008099375B2

(12) United States Patent
Driessen

(10) Patent No.: US 8,099,375 B2
(45) Date of Patent: Jan. 17, 2012

(54) NON-CLASSICAL SUSPENSION OF A LOGIC GATE

(76) Inventor: James L. Driessen, Lindon, UT (US)

( * ) Notice: Subject to any disclaimer, the term of this patent is extended or adjusted under 35 U.S.C. 154(b) by 386 days.

(21) Appl. No.: 12/184,229

(22) Filed: Jul. 31, 2008

(65) Prior Publication Data

US 2009/0119543 A1     May 7, 2009

Related U.S. Application Data

(60) Provisional application No. 60/956,707, filed on Aug. 19, 2007.

(51) Int. Cl.
*G06N 5/00* (2006.01)
(52) U.S. Cl. ........................................................ 706/45
(58) Field of Classification Search .................... 706/45
See application file for complete search history.

(56) References Cited

U.S. PATENT DOCUMENTS 7,484,096 B1 *   1/2009   Garg et al. .................... 713/170

OTHER PUBLICATIONS

Horvitz, et al., Decision Theory in Expert Systems and Artificial Intelligence, International Journal of Approximate Reasoning, vol. 2, Issue 3, Jul. 1988, pp. 247-302.*
Cooper, Probabilistic Inference Using Belief Networks is NP-Hard, Artif. Intell., pp. 393-405 , 1990.*
Rejimon, et al., Probabilistic Error Model for Unreliable Nano-logic Gates, in IEEE Transactions on VLSI, 2009.*
Jonathan Miller, "Jonathan Miller's Brief History of Disbelief," BBC documentaries Four: Atheism (as viewed on youtube.com, http://www.youtube.com/watch?v=Iz6IDEtLyWk); Originally aired on Mondays Oct. 31, Nov. 7 and 14, 2005. First Volume featuring British Philosopher, Colin McGinn.
Rene Decartes, "Meditationes de prima philosophia (Meditations on First Philosophy)" (as translated and viewed online at http://en.wikipedia.org/wiki/Meditations_on_First_Philosophy) J., Cottingham, ed (Apr. 1996), Meditations on First Philosophy With Selections from the Objections and Replies (revised ed.) Cambridge University Press. ISBN 978-0521558181.—The original Meditations, translated, in its entirety.
The Odyssey, Homer, 800 B.C. (as translated by Samuel Butler and viewed online at http://classics.mitedu/Homer/odyssey.1.i.html) Hephaestus, minor character, the god of fire and iron-working. Hephaestus crafts divine goods (as intelligent objects) for gods and men. Ici.
"About Page" Association for Uncertainty in Artificial Intelligence (AUAI) (as viewed at http://www.auai.org/.
Bayes' theorem. In Wikipedia, The Free Encyclopedia., from http://en.wikipedia.org/w/index.php?title=Bayes%   27_theorem &oldid=431262452.
Spacetime. In Wikipedia, The Free Encyclopedia. retrieved from http://en.wikipedia.org/w/index.php?     title=Spacetime &oldid=432281311.

(Continued)

*Primary Examiner* — Wilbert L Starks, Jr.

(57) ABSTRACT

The computer implemented life form (CILF) is a belief program which excludes all three of the classical logic paradigms, it can then (at least for discussion purposes) be considered derived from a form of "non-classical" logic. Certainly, even the mere idea that reality itself could possibly be nothing more than a simulation, could easily be considered a new (neo-classical) and useful form of non-classical thought. The programming methods used by the CILF are non-computational, meaning they will not generate any independent fact or data. Instead, the CILF programming method will merely check data to form a state of belief or doubt upon the input data from which a new and improved data store can be more correctly and effectively established.

21 Claims, 4 Drawing Sheets

OTHER PUBLICATIONS

Sir Isaac Newton, "An Historical Account of Two Notable Corruptions of Scripture" (1754); Print—Kessinger Publishing, LLC (Jun. 13, 2009) ISBN-10: 110461281X.

Blaise Pascal. In Wikipedia, The Free Encyclopedia. retrieved from http://en.wikipedia.org/w/index.php?title=Blaise_Pascal&oldid=429974958.

Game theory. In Wikipedia, The Free Encyclopedia. Retrieved from http://en.wikipedia.org/w/index.php?title=Game_theory&oldid=432261852.

Albert Einsein, Relativity: The Special and General Theory, Publisher: Broadway (Jun. 6, 1995) ISBN-10: 9780517884416.

Rolf Pfeifer and Christian Scheier, Understanding Intelligence, MIT Press, Cambridge Mass., (1999) ISBN-0-262-16181-8.

J.S.Bell, Speakable and Unspeakable in Quantum Mechanics, Cambridge University Press, ISBN 0521334950 (1987).

Richard Hönigswald, Die Skepsis in Philosophie und Wissenschaft, 1914, new edition (ed. and introduction by Christian Benne and Thomas Schirren), Göttingen: Edition Ruprecht, 2008, ISBN 978-7675-3056-0.

* cited by examiner

NON-CLASSICAL SUSPENSION OF A LOGIC GATE

RELATED APPLICATIONS

Priority in this application is claimed to Provisional application number USPTO 60/956,707, filed 19 Aug. 2007 by same inventor.

REFERENCE TO SEQUENCE LISTING, A TABLE, OR A COMPUTER PROGRAM LISTING COMPACT DISC APPENDIX

Under 300 lines are included in this specification.

BACKGROUND OF THE INVENTION

For an understanding of the computer implemented life form, we must begin by questioning ourselves about more than "what is life?" But, we must really ask the question of "what is intelligent life?"—or "sentience" as it is often called. Colin McGinn (born Mar. 10, 1950) a British philosopher currently working at the University of Miami, has postulated that humans are incapable of defining sentience. McGinn speculates that the human mind is incapable of comprehending itself entirely, and that this incapacity has primarily occupied most of Western philosophy since Descartes. Thus, McGinn's answer to the hard problem of consciousness is simply that humans are not capable of and cannot ever find the answer to the question, what is life?

The roots of artificial intelligence (AI), however, date as far back as early Greek mythology with mythical and animated objects. For example, the Argo was the ship of the Argonauts which was a vessel possessed of speech because at its prow Athena fitted in a "speaking timber." The Greek myths of Hephaestus and Pygmalion even incorporated intelligent robots. Many intelligent artifacts have appeared numerous times since then in literature as fictional mechanical devices often behaving with intelligence.

The prior art of uncertainty computing is much more recent. The Association for Uncertainty in Artificial Intelligence (AUAI), for example, considers itself to be at the very "forefront of research in Artificial Intelligence."

BRIEF SUMMARY OF THE INVENTION

The present invention, while also related to the use of "belief" systems in computing, differs greatly from uncertainty computing. The inventive step of introducing belief into the program is that belief is not uncertain at all. To the contrary, it is "fact" that is completely fleeting in this world because there is no fact which is completely 100% irrefutable; every empirical occurrence, measurement, or observation is subject to some tolerance for error. Belief, on the other hand, is only subject to confines of the program. Belief is therefore not probabilistic. It is perfection and can be computed exactly with no uncertainty.

| The Belief Algorithm | | | |
|---|---|---|---|
| `< >` | | | |
| `:start` | | | |
|     Set belief=0 | | | |
|         Set true=a | | | |
|         Set trust=b | | | |
|         Set false=c | | | |
|     Run input confidence | | | |
|     If confidence=null | | | |
|         Set confidence=1 | | | |
| :sample input | input truth | input lies | input truth |
|     :ask | First Iteration | Second Iteration | Third Iteration |
|         ask question | answer=x | answer=z | answer=x |
|         if confidence=1 | confidence=1 | confidence=0 | x=trust |
|         set userinput=trust | x=trust | z=trust | |
|     :act | if x=a;x≠a | if z=x;z≠x | if x=x;x=x |
|         if trust=true goto entrue | if x=c;x≠c | if z=c;z≠c | if x=z;x≠z |
|         if trust=false goto enlie | if 0=1;0≠1 | if 1=1;1=1 | if 0=1;0≠1 |
|         if belief=1 goto knowledge | | | |
|     :enlie | | | |
|         output 'I don't believe' | | I don't believe | |
|         goto reveal | | | |
|     :entrue | | | |
|         output 'I will trust' | | | I will trust |
|         goto knowledge | | | |
|     :guess | | | |
|         output 'I see, 'trust'' | | I see,x | |
|     :reveal | | | |
|         run input belief | | belief=1 | belief=0 |
|         if belief=1 | | x=true | false=z |
|             set trust=true | | x=trust | |
|             set 'true'=trust | | | |
|         else | | | |
|             set false=trust | | | |
|     goto ask | | | |
| :knowledge | | I know x | I know x |
|     output 'I know 'true'' | | continue | pause |
|     run input confidence | | | |
|     pause/continue | | | |

-continued

The Belief Algorithm

```
            if confidence=1
            if confidence=0
        if belief=1
            goto guess
    else
        goto reveal </>
```

The entire world existence is always uncertain, but personal beliefs are actually not uncertain. The probabilistic approach to belief therefore is the ancillary to intelligence where choice is the core. A true belief program eludes Laplace's Demon in that true intelligence, unlike computational intelligence, is not probabilistic; it is a choice.

(Of course Laplace's demon is a hypothetical "demon." It was posited in 1814 by Pierre-Simon Laplace. It goes like this: if that demon could know the precise location and momentum of every atom in the universe at any one instant, then it could use Newton's laws to reveal the entire course of all cosmic events of the past, present, and future.)

Although probabilities can be used to influence the rate of learning, humans find these sorts of probabilities, like Laplace's Demon or Baye's theorems a little counterintuitive, because we do not actually calculate probabilities all that often in our decision making. Except when specifically tasked to compute probabilities (such as in game of chance) most humans simply line up the positive against the negative and make a choice. The above sample algorithm places faith and choice into its decisional tree so that the well known aspects of computational computing are ancillary assistance to the decision, but choice is the core.

In this way the above algorithm, although it is incapable of computing any fact, it is still a better simulation of human decision making because although the mind is capable of making calculations, all decisions are based on belief and choice either dependent or independent on every bit of information it receives. The belief algorithm is not a computational algorithm, but merely a choice algorithm. It must work in conjunction with other well known computational algorithms in order to compute any fact. Once an input is computed, the belief algorithm begins with that input as some fact answer, x, as the truth and where z is the false or lie. Input by definition, must always be supplied through some outside source or sensor.

In this example, the input is allowed to be either a lie (unreliable) or truth (dependable). The program's belief on the fact may be revealed or guessed. For the example, a program user, above, tells the truth on the first iteration and lies on the second. The Pause/continue then becomes the program state determined by a plurality of external stimuli resulting in a challenged state (continue) or satisfied state (pause). Any inconsistencies between the program state and the external state will result in a continuation, thereby creating another iteration. The pause/continue duration is for an unspecified length of time. The continuation is triggered when additional input data is received. Undefined parameters may exist anywhere between random and Lapace's Demon, which is the true state of skepticism for all things: i.e nothing can ever be absolutely true or false, but merely a state existing somewhere between involuntary (without purpose or intention) and intentional (caused for a purpose).

Therefore, this program is not about artificial intelligence as much as it is artificial faith. The input Confidence and Input Belief routines referenced by the program are only measures of the program's validation within its own pool of previous outcomes. The program is not crippled by the lack of a sophisticated computational belief network. The program can make a belief choice whether or not it understands the question, whether the answer is a lie or truth, and it can always act on the belief.

The trick is that these outside computational routines, which are well known and can be an important part of decision making, are allowed to be either simplistic or sophisticated and still the program can make a choice. The above algorithm is deployed only as a "front-end," so-to speak, that can work with a more sophisticated Bayesian type network or any form of computational intelligent machine if true computational intelligence is desired.

Where it is only a matter of the size of the knowledge base from which it draws; the program can still learn within the confines of each question posed, whether or not the probabilities and outcomes are fully understood. By nature, all the probabilities can never be known anyway, i.e. Laplace's Demon: we can never know the entire set of variables that the entire universe has to offer.

The probabilistic approach to indefinite (uncertainty) computing, therefore, is well known and can be a great predictor of truth and lie, however, with no ability for a faith based belief state within the program, any answer whether correct or incorrect in the so-called belief networks have an inability to actually make a choice. Absent any Bayesian framework, the following could be used as an example of a computational belief confidence pool calculator with only a collection of positive or negative outcomes, rather than probabilities:

$$\text{input Belief} = \sum_{j=1}^{n} E_j M$$

E = experiences, M = Magnitude, where each E has a positive or negative effect on the net i.e user has lied before(negative), no motive to lie(positive), does user sweat(negative), past experience to similar questions (positive), etc., Sigma resulting in a measure of the tendency to believe.

$$\text{input Confidence} = \sum_{j=1}^{n} P_j$$

P = precautions, where each P has a positive or negative effect on confidence levels of the input Belief, i.e internal program parameters, previous strategies, risks, rewards, etc. Sigma resulting in a level of confidence.

In this example, personality then can be the basis for the beginning state for belief/confidence where there is no prior data for confidence (i.e. belief/confidence=null set). Then the program must supply what is being defined herein as the initial machine tendency where the beginning state for the belief and confidence variable, belief/confidence is: 1/0=naïve; 0/1=Skeptic; 0/0=timid; and 1/1=arrogant. If prior relationships exist from memory, then confidence may be set to 1 or 0 accordingly.

This example of wisdom shows that the program should always begin as a skeptic, though it may learn to trust certain users or situations and the conversion from skeptic to arrogant is natural and occurs quite instantly. The program can even act without confidence allowing for a truly intelligent learning strategy to out with opponents in any belief or deception strategy such as in a game of poker, lier's dice, etc., but we can also use the belief algorithm to simply teach our machines to be wise.

Belief is only an answer to an internal question. It can be represented in binary form using 1s and 0s: 1=on (belief); 0=off (doubt). And belief by choice can consider a confidence level when new input is received, but reliance on data is the call to action—or in some circumstances, the call to inaction.

All the intelligent Bayesian networks can be used to make the machine seem more computationally intelligent and can produce more accurate answers, but only the belief algorithm can bring animation to the program. Belief is always superior to knowledge, because ultimate knowledge never exists, whereas ultimate belief can not only exist, but cannot be diminished nor destroyed.

People will tell you that it is impossible to get a computer to actually make a choice, but perhaps we just haven't programmed them right yet. Fact is fleeting; as it is only applied to a best guess of the moment; there is always a tolerance for error. Nothing in this world is certain or exact, but a belief can be perfect within its own realms. But remember, believe and doubt although they seem like opposite things, they are both related to different levels of trust. Belief and doubt are really the same thing only opposite to knowledge, where absolute knowledge is only a form of arrogance.

In this binary language, if something were already known to be absolutely true or false, there would be no need for belief. But since no facts in this life are known for sure, we then apply belief or doubt to an action of either accepting any input as true or dismissing it as false. In many circumstances in computing, we always just assume either true or false and skip the belief part. That is the nature of binary coding. It just doesn't seem to have a 0.5 between "1=on" and "0=off."

In the algorithm above (program simulation) we merely simulate real life choices with or without computational analysis. We receive sensory input or input from other human beings and we must always start from a place of skepticism. We begin by exhibiting some level of trust, because without reason to distrust, we normally want to believe in what to the world shows us. Or, we are told by others about the truth of things, but at some degree we always remain skeptical. Sooner or later, however, truths have a way of being revealed; either the person telling the lie comes clean or we find out some other way. In the above program simulation, we just shorten that process.

But there is no rule that says we cannot also apply a binary to a gradient value; i.e. the glass is neither full nor empty, it is just either barely enough or barely not enough; never exactly half, but either just under half or just over half. With a cognitive belief decision, yes, there is a gradient for belief and doubt; you can either believe strongly in something or your belief may only be slightly in favor of the decision, but the decision is still a yes or a no. You can also doubt something weakly or strongly, but in the end, in the action part of your programming, your action will only involve a true or false decision; either you trust the information and act upon it or you don't.

In those close call situations for call to action, we typically like to apply caution, but the belief must still be only one of two choices, either on or off. Consider this real world instance for example:

You are not sure your partner is telling the truth, but you know that if you do not show trust to her, the relationship might be broken unnecessarily. So, you choose not to believe, but you act as if you do believe while employing an investigative algorithm to prove or disprove your hunch. In other words you still made the decision to doubt, but because the level of doubt was very close to belief, you chose an action of caution.

Oh! And do not confuse belief with a positive or negative result. You can believe something to be false, just as easily as believing it to be true. But of course there is another perfect aspect of any belief algorithm, which is that the answer is not really found, but the answer is only what we choose to accept as right. The empirical answer is always separate from the belief question. Computer programmers, by shear efficiency always seem to skip the belief portion of the computation altogether. After all, who would want such indecisiveness added to a computer program that is supposed to always return correct answers for us? Who wants a program that you can't trust?

Avoiding belief, however, is entirely unnecessary. Belief is still an exact decision. It is still a true or false variable. It is simply that the true or false variable must lie within the other true or false variables—it is a presumption, but still an exact presumption.

We want to trust the answers computers give to us or their information may seem not very useful. There is something that separates a belief question from a standard if then else programming language function. The obvious difference is that the if then else questions used in classic programming languages are always external questions, i.e the program requires some input to first test (If conditional X exists then return Y, else return Z). But with belief, there must be an internal question (internal to the program or with humans, internal to the brain) where the program itself has to supply an answer to the query, "do I believe?"

Our human brains certainly operate very similar to a computer when determining answers to questions. For example, if someone asks you, "what is your name, your brain searches its repository of knowledge, finds where that information is stored, and you give an answer; "My name is [your name]."

Likewise, if someone were to ask you a simple true or false question like, "is your name, [your name]?" your brain will again simply search its repository and find the answer to the question, "what is your name?" and then compare the externally supplied information, [your name], with the internal answer to your name the brain comes up with, and if there is a match, you respond, "true, yes that is my name."

There, however, is a key step that all humans go through in answering any question that a computer normally doesn't. For us humans, whether internal or externally posited, an answer to a question must always first access the "belief" computation.

In fact, if a Human were asked a true or false, "is your name, [your name]" and an internal search came up with an answer, but for some reason (consider an amnesia victim for example) the answer might come back something like, "people around here tell me that my name is John, but I don't remember if that is correct, so I can't really tell you."

DETAILED DESCRIPTION OF THE INVENTION

Figure 1:
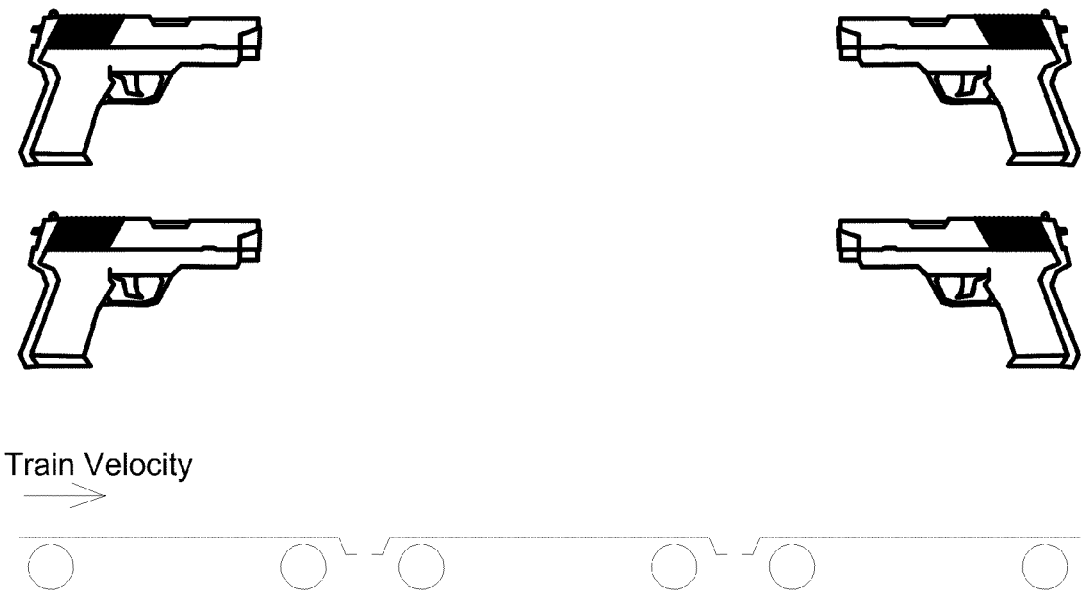
FIG. 1 represents a modified "Einsteinian" train carriage. The bullets from 4 identical guns at identical distance from the center of the middle carriage are fired in theoretical simultaneity. The conundrum of this thought experiment is to determine which of the bullets will arrive at the center of the train first (if any). Reality is not what we think it is.

In order for the reader to understand and appreciate the inventive step involved in making and using the Computer Implemented Life Form invention, an understanding of the true "meaning of life" is required:

"A hungry man once came upon a tree full of ripe and delicious cherries. The man neither picked cherries nor left one single cherry on the tree. Yet he went away from the tree nourished. How?"

The idea that reality could be both a universal phenomenon as well as a personal experience has been an idea that most scientists dare not peradventure, less they be called heretics. Yet, the known concepts about the study of reality all lead ultimately to the same conclusion; reality is not something uniformly shared, but is a rather personal and unique occurrence for each observer. If your reality is truely different from mine, then whose reality is this and in which one do we really exist? Is it my reality or is it yours? Or even more profound, can our realities be different and yet remain true for the both of us?

The more we learn about miraculous things, the less supernatural they become. Take the U.F.O. phenomenon for example. It isn't a requirement that every unidentified flying object necessarily has to contain alien beings from another planet; it is just that those who saw them did not have an explanation for what they were. The same is true for all of those numerous other misunderstood nuances in the world around us. As we try to understand just exactly what is real, what is not, and how it all came to be, all we are actually delving into is the study of the metaphysical or "magical" unreal world. We not only have to ask ourselves what is real, but we have to understand the concept of reality in general before we can even approach the question. Like Descartes, the 16th century philosopher, we should always begin with skepticism whenever trying to define what and what is not real. However, my aim is not to undermine philosophy, but to perhaps place us on more secure foundations.

The scientist's difficulty, I believe, is that a person cannot answer all those nagging questions about the universe with experimentation alone. If it were that easy, we may have had it licked by now, but a true understanding of the universe will require more than knowledge; it will require a certain faith. While I am not saying that religion is the only answer; I am saying that the answer can only lie in an understanding of both the natural and the supernatural; or in other words, we need to both: (1) understand as much of the science of the metaphysical as we can, and then (2) become better acquainted with the metaphysical through an understanding of deity, or the one whom I shall call God.

Which then, should we first try to understand, science or faith? All the wisdom in the entire world, from all the arts and sciences, and all of our present day understanding could be considered to have come from God; that is if you believe in God. And if you don't believe in a god, then you might at least accept that knowledge, unless it is misused, is still a good thing designed for our good—or at least designed for capability of doing good.

By "designed," I don't mean to advocate the "intelligent design" theory either, which is part of the popular religious right conservative movement in primary education today started by some in attempt to bring prayer back into the public school system. I merely mean to say that more knowledge is better than less knowledge; and therefore, knowledge is a good thing.

But to obtain this wisdom of the metaphysical, in particular, I believe it is a two step process; that we first have to study it out, meaning study out the science; and if it is right, second, we shall have to feel that it is right—which is not a concept too readily acceptable by those who have grown accustomed to theories and the scientific methods. To be able to feel that something is right, though, does not make it less realistic or even less correct. It is really just another way to arrive at the same conclusion only instead of physical experimentation; we use logic, reason, and faith.

For those of you who think that all faith and religion are devoid of logic or reason, you are sorely mistaken. Take the 17th century thinker, Blaise Pascal. He was a French mathematician, physicist, and religious philosopher. Pascal argued that it is always a better "bet" to believe in God, because the expected value to be gained from believing in God is always greater than the expected value resulting from non-belief. It is important to remember that Pascal's wager or "gambit" is about the belief in God, not the existence of God, but if you were to analyze your options in regard to belief in Pascal's God carefully (or belief in any other religious system with a similar reward and punishment scheme), you would come out with the following possibilities:

You may believe in God, and God exists, in which case you go to heaven: your gain is infinite.

You may believe in God, and God doesn't exist, in which case your loss is finite and therefore negligible.

You may not believe in God, and God doesn't exist, in which case your gain is finite and therefore negligible.

You may not believe in God, and God exists, in which case you will go to hell: your loss is infinite.

From these possibilities, and the principles of statistics, Pascal deduced that it would be better to believe in God unconditionally. It is a classic application of "game theory" which is a way to itemize options and payoffs and in game theory the answers are always valid within the assumptions made.

But then, faith will become the last piece of the puzzle—at least the last piece in the puzzle we are currently working on; the ever present metaphysical world. Meaning that for this perspective, we will have to have faith of the existence of things that cannot be proven, but can still be understood even loudly and clearly. As with Pascal's Gambit, your faith will not be the basis for the existence of God, but the existence of God may be the object of your faith. In other words, if there is a being out there whose "eye is on the sparrow" and knows your every thought, you must consider the new type of wager; that is a wager that does not belong to you. Instead of you making the bet of whether or not there is a God, someone else is betting on you. Turn your game theory around; God just might have a wager on you. If God is a supernatural being who is all knowing, and you have knowledge (faith) that He is all knowing, then it follows that there is some purpose for this arrangement. He will always keep you in the driver's seat.

God is counting on you! He is counting on you a whole lot more than you can possibly be counting on Him.

My words in this application should speak concepts of the supernatural to you, but your mind will hopefully also focus naturally on the scientific endeavors for understanding of the metaphysical. The difficulty comes when we have exhausted our capabilities for discussion of the sciences; you will then have to make this leap into faith I am talking about, which is the only way to take the next step in unraveling any of the mysteries of the metaphysical universe.

Oh! and the answer to the question about the cherry tree: pick just one! Or, you could also just leave 2.71828, but then your reasoning will collapse.

Duality and Alternate Mortal Probations

Duality, then, is that which consists of both the physical and the metaphysical. But in the purely metaphysical, that which is outside of our "reality," time is not linear. And time, therefore, is the fourth dimension which from a creationists viewpoint, places a barrier between human beings and their creator; a veil, if you will, that we cannot see what lies beyond. When the body dies however, there is nothing stopping the metaphysical soul (the "I Am" which is inside of each of us) from moving outside of time and space. Our linear perceptions fool us as to the essence of duality by clouding the truly spiritual (metaphysical) nature of our existence. In reality, the physical things seem the most real. In duality, it is the intangible that is the most solid and the most permanent.

In order to really understand the concept of duality, you have to accept the law of Counter Intuitive for the Intangible (CII). That is, that our intuition about reality and the way we perceive the physical reality around us actually steers us away from understanding the nature of duality which is the true essence of our being. You can either believe that this CII (pronounced "see-two") was placed there by a Creator to serve some purpose in the spiritual progression of mankind, or you may choose to be an unbeliever and simply accept the CII as a product of nature. But either way you choose to look at it, our linear cause and effect view of all human behavior will prevent our observing the purely metaphysical, but the metaphysical can be just as real, if not often more so, than the physical portions of this duality.

For example, in psychology, we like to think of a schoolyard bully as the tough guy who thinks he is the "big shot." When we actually delve in deeper and below the surface, we come to realize that the bully is really not the one who thinks big of himself, but is rather the most insecure of all the classmates.

Looking at the motivations, the bully himself is the one with the need for pushing others around; it turns out that it is his insecurities that beckoned him to do something about it. Usually it turns out that the bully was beat up or pushed around himself by someone else. Then the reaction was to try and prove his own strength in order to defeat his feelings of inadequacy. So, he lashes out at school.

There are many examples of the counter intuitive nature of the intangible. Music is yet another great example of the CII: music touches the soul, yet what really is a melody? One disjointed mixture of tones and beat should intrigue us just as much as another, but certain pitch, meter, and tone can make one mixture of sounds so moving, when another mixture can sound so disturbing to us. The music leads us down a path of emotion and then surprises us with an unexpected chord progression. Comedy is like that also. What is it that makes something so logical and predictable, but when given unexpectedly makes us roar with laughter? "Why did the chicken cross the road?" That joke is not the least bit funny to us now that the answer is completely expected.

A thought is not physical reality. Numbers are said to be real, but you can't touch one other than the thing it is written on or made out of. These things are just ideas and concepts to us in reality. In duality, however, these things are actually more real than any of the physical reality we normally think of. As discussed in the paragraphs below, there is no physical thing that can be exactly quantified. Remember all matter is mostly made up of empty space: there is far more space between the particles than there are particles (or "standing wave forms" if you only believe in the physical universe).

You can never have exactly one thing when you actually try to fully quantify it. For example, what is exactly one meter? There is no method of determining anything to exactness. When we begin to divide up the meter, we find that a meter is only equal to 10 decimeters, 100 centimeters, 1000 millimeters, or 1 million nanometers. There is nowhere to end how fine you want your accuracy or tolerance for your measuring device to be. Yet if we forget the truly objective or quantifiable and instead focus our quest for understanding within the nature of the CII, for a "one meter" measuring stick, quite subjectively, yet in a very exacting manner, considering only the bounds of the thing defined, the logical definition of "one" thing (the concept of a singular meter) is completely undisputable.

So, now we put away our measuring sticks, because the objective one meter is a falacy, yet the totally subjective quantity "one" is absolutely definable. So, instead of a one meter stick, we might try the better measuring device, the one meter length of space since it just isn't subject to any margins or error we have to assign to hard objects. But can we even use space itself as our measuring device?

We still have the problem of space and whether or not to ascribe any reality to it at all. It is a characteristic of Newtonian physics that we have to ascribe independent existence to space, time, and matter: in Newtonian physics all things must exist in reality. But in the metaphysical, 16th century mathematician Rene Descartes tells us we must doubt all reality.

When your beloved kisses you good night and you go to sleep, do you not do so knowing absolutely that she is a true spirit and you are in love with her and your love for her is real. That is more real than any other thing you can touch in this universe. Yet the more obsessive or possessive your love for her becomes, the greater the tendency for a loved one to be turned away. In love the CII becomes apparent to us only after great trial and error in our lives, e.g. "if you love something set it free . . . " author unknown.

Einstein in developing his special and general theories of relativity also had to consider whether or not to ascribe any reality or existence to empty space. After all, nature abhors a vacuum. Before we can go on to talk about how empty space can play a role in general relativity, we really have to delve way back into the ideas of existence itself and whether or not we can be sure that anything exists at all. The best philosopher to study about those foundations in his area of metaphysics would probably be the same whom some would call the father of metaphysics, Rene Descartes, also the father of the Cartesian coordinate system, who also authored six meditations in his work for the Church in the late 16th century. Below, is an analysis of those meditations given with a somewhat more modern understanding and in consideration of further light and knowledge that has been disclosed to us in our time. For this consideration, we will borrow from Descartes of his understandings about the state of reality and then apply it to our own modern understanding.

All the Things we May Doubt

All that we know comes from the senses, but by nature, our senses can be deceiving. While it may seem insane to doubt the reality of the corporeal things we observe with our senses including earth, sky, and even our own bodies, there is still not any absolute proof of what we perceive, because our senses may fool us. But non-corporeal truths such as concepts or ideas, for example, "two plus three equals five, or a square has but four sides" are true whether or not any corporeal thing exists, at least within the realm of this existence; that is if we exist at all.

As humans we are on this world and placed in a condition of skepticism for all things. Who or what could have thought of such a world where the inhabitants thereof are captured by unconsciousness (sleep) on a regular basis. When we dream, we are often completely unaware of the reality of waking times, yet there are instances when our dreams seem every bit as real as the waking times. So, we believe that our dreams may deceive us, but why should we not accept that our wakefulness might deceive us as well?

Then, the probability for us to be so imperfect as to be the constant victim of deception would require an external power at least in proportion to the power possessed by the cause of such a deception. Thus, there is nothing believed to be true which is impossible to doubt, where faith and doubt are merely two sides of the same coin. So, when we consider our own doubt then, we must doubt the truth of all things with equal vigor as we would doubt their falsity.

Non-Corporeal Truths (of the Mind) are More Certain that the Corporeal Truths (Sensed by the Body)

Even if deceived by our senses, in order to be deceived, we must still exist. Therefore, deceived as we may be, our existence is necessarily proven each time it is expressed or conceived by the mind (I think, therefore I am). A thinking thing is a thing that doubts, understands, conceives, affirms, denies, wills, refuses; that imagines also, and perceives.

A piece of wax, for example, is a thing. Yet when placed by the fire, it melts. No thing has a constant shape, smell, color, figure, or size. All things are in a constant state of change. Modern atomic theory would even suggest more empty space than actual particles and constantly expanding or contracting. So, if you believe in an atomic theory, individual things therefore can have an infinite number of shapes or properties. Consequently any specific conceptions we have of things are still the product of the faculty of imagination.

Yet, things cannot be what the mind alone perceives them to be, because even though in a constant state of change, it would be insane to suggest that every thing is imagination only. This is not a circular logic, rather it introduces the concept of extension, whereby extension means that things exist in space only as an extension of our perceptions. Yet empty space, which we perceive as nothing, is abhorrent to believe as something that exists. Thus this empty space is only an extension of those things that are contained in it and those things contained in it are extensions of our perceptions of what we perceive them to be. This state of extension is the existence of our corporeal (physical) world, as we perceive it. Yet the question remains, whether our perception is the least bit necessary in order for the corporeal world to exist, i.e. the age-old adage, "if a tree falls alone in the woods, will it make a noise?"

So, if we can't even be sure of the existence of any corporeal things, even people we meet on the street, then, are simply extensions of the faculty of judgment alone, which is in the mind, and they are products of only what we believe we see with our eyes. Considering our world in the atomic theory, wave-matter theory, or really any theory in which you want to fathom your existence, it is now manifest that bodies themselves are not properly perceived by the senses nor by the faculty of imagination, but by the intellect alone; and since they are not really perceived by sight and touch, but only because they are understood or rightly comprehended by thought, nothing is more easily or clearly apprehended than that which we contrive with our own minds. But because it is vane and difficult to rid one's self of the concepts of reality that we have become accustomed, and lest we become convinced in our pride that it is our own self centered minds that are the cause of all existence, it will be desirable to tarry for some time at this stage, that, by long continued meditation, we may more deeply impress upon our memory this new knowledge. In other words, lets just stop and think about it for a moment, because a priori, we are thinking beings.

If Anyone can Exist, then God does Exists and he Shall not be the Deceiver

There are three basic or distinct types of ideas or classes of thought. They are volitions, affections, and judgments. Or you may call them desires, feelings, and conclusions if you wish, but they are just categories. But even within those categories of thought there are but two cause and effect relationships for thoughts. They are: one, that we are deceived by our thoughts (falsity and error); or two, that our thoughts do not deceive us (honesty and truth).

As we have discussed above, some of these thoughts are reactions to the senses; in other words, before we even form our thoughts based on the senses, we could have already been deceived by our senses. Then there are the thoughts that are simply independent of the corporeal; in that the truth or falsity of our thoughts will not depend the least bit on the extension of our senses.

Then let us consider some of these ideas that do not depend on any objects in a real world. Some appear innate (ideas in and of themselves); others adventitious (not corporeal, but derived from the corporeal); and others to be made up entirely (factitious).

Take for example the minds ability to count things. We know that the corporeal objects we choose to count are capable of deceiving us because there is no such thing as absolute precision in anything. Every physical or mechanical object we consider is subject to some tolerance for error. We just allow ourselves to accept a certain margin and call it good. Take for example, our one meter measuring stick. To us, one meter stick is just as good as the next, but if we really examined two different measuring sticks on a microscopic level, we would see that no two measuring sticks are ever exactly the same. Even if we could test the exact number of atoms in each of the measuring sticks, no two things can occupy the exact same space with the exact same temperatures and thus the constant state of expansion and contraction of molecules alone would not allow two supposedly identical one meter measuring sticks to precisely be identical; it is just close enough for us to dismiss all argument.

But then there is also a non-corporeal aspect to counting, which is the mere subjective framework that our minds have created for the ordering process of counting. Take again for example, our one-meter measuring stick. Even though we cannot ascribe to our senses as to the precision of the stick, we can ascribe to the concept of its singularity. In other words, we can count it—and when we count, there is but one. No matter that it cannot ever be exactly one meter, it is none-the-less capable of being exactly one thing, one object, a singular instance in our minds to contemplate.

Then the subjective idea of counting things is a type of idea which although indirectly derived from our senses, it does not actually depend on our senses. Counting therefore cannot deceive us within our own framework (unless of course there is a creator capable and willing to design this entire framework as a part of an elaborate deception). An understanding of the counting of quantities therefore falls under the category of an adventitious thought; i.e. we are given a concept of corporeal "things" through the extension of our senses and then our minds seek to place some order over the concept of quantity over the extension.

Humans are thinking (conscious) things, that is, beings who doubt, affirm, deny, know a few things, and are ignorant of many; who love, hate, have a will, and who imagine likewise, and perceive. And if we have imagined that two and three make five, there is no denying or deceiving, because counting is but a conceived framework within those confines of our own imaginations. The exercise of counting then is not subject to the senses, only to our thinking minds.

In our own minds, two and three make five. We can ask another person, and get the same; two and three make five. But then we might ask ourselves; could we be deceived even about the framework of our own imaginations? Or more importantly, who or what could possibly be capable of such an infinite deception that we could be wrong about the counting concept independently of our senses? Is there ever a possibility that two and three do not make five? And what power could exist that even the spirit of our own thinking mind could be so deceived.

Yet if we are not deceived, what kind of power can take physical things which have no objective truth to them (i.e. no exactness, as discussed above) and then place order over those objects capable or making us perceive them as real objects. In order to consider either such deception or such majesty, then we must consider deity, or a power greater than the whole of our existence. And again, just as we strive to understand the truth of things, we must equally try to understand that which is false (what is cannot be produced by what is not). So, when we can seek to consider power and majesty of deity capable of designing the order of counting for our minds to discover, we might also consider how deity could have deceived us in our adventitious discovery.

On the other hand, we must consider too that we are not deceived and the subjective counting of things existing per singuli (i.e. innate and true in and of itself, deity not included) is a possibility. To fathom such thoughts we must again return to conceptualization, or the possibilities of thinking and of the thinking mind.

There are only four alternatives to the framework suggested above as to how the concept of quantity (counting) has come to be in our minds:
1. There is a God and that power has ordered quantity as an instance for our minds to discover.
2. There is no God, but the counting of quantities is a simple truth in and of itself.
3. There is a God and deity has deceived us as to the order of quantities.
4. There is no deity and the counting of quantities is but a simple falsehood.

Some of our volitions (wants) can be denied by our existence, i.e. you can't always get what you want. However, some of our other volitions cannot be denied; in other words, we just make the choice and it happens. In our brains, for example, we simply choose to open our eyes and then it happens. The only way to deny that volition would be to poke out our eyes or otherwise seal them shut. But as long as we have eyes and a muscular skeletal system with nerves, we can open them.

We then confront ourselves with the realization that counting holds true across from one individual to another. It doesn't matter whom or what taught us counting, they all taught us that two and three make five. Counting, therefore is not an idea of the mind alone, innate to us babes of the womb, but rather taught to us through our extensions. And through that confirmation from both our minds and of our extensions, that two and three make five, it is no longer just a part of our individual minds, but has been extended. This is to suggest that counting is both a subjective and an objective process, but we can continue to refocus this examination on just the subjective portions alone.

Thus, because other persons can confirm our counting of things, three of the four alternatives for existence of deity can still exist, but as to the fourth alternative, that two and three do not make five, it has no purpose in this existence. If in some "land of nod" where two and three make something else, then let those citizens live in their own land, for we in our own exploration of these principles we have no need for another two and three here. So unless and until there is a chance for us to pass on to the next world, the next existence, we only have our reality to deal with here and the idea that two and three do not make five is simply "out of this world" and can therefore can be dismissed from this world without further ado. We just cast it out of our world just like that. It is one of those volitions that we all can simply partake in and we cast out any idea that two and three equal anything but five in this world, no matter who or what created it.

Perhaps we should now seek to eliminate some of the other alternatives above. We have seen, for example, that two and three make five both in our minds and in our extension and the idea that two and three do not make five has been found repugnant to us and has been cast out. But to cast God out as a deceiver, we have not yet arrived, because a power capable of creating an order of quantity for counting is certainly also capable of deceiving us. We are still left wondering whether or not there is a God, yet also whether or not God has deceived us.

So let us turn to the alternative that there is no God, i.e. there is no God and two and three make five inherently. Let us look outside of our windows on to the street below. And if you have a house with windows and there are people below, to the people we see passing by on the street, in the minds of those other persons who have no choice but to be a part of our extension now that we have looked at them, whether deceived or not; all of their extensions, whether the truth of two and three make five is truth created, truth per singuli, or even deception thrust upon us; to those people, now because of our realization of them; they have no choice but to be deprived of the simple "I think, therefore I am" proposition as discussed above, but rather are left with a "We think therefore we are" proposition, because we perceive them and they have no choice in that. And since our citizens of "Land of Nod" spoken of previously, have been cast out by us because two and three make five for us, then two and three make five for them as well. In every instance and for each of those persons walking down on the street, two and three make five.

And now returning to our quest we are engaged, which is an attempt to rule out any of the four alternative frameworks above, to arrive lastly at the one correct and true status of things, the next step is to rule out is whether God can be a deceiver. It doesn't matter whether or not there is a God at this point except that if there is a God, we can rule out that God is a deceiver, at least as to this world.

No matter the reasoning or purpose, two and three make five, so for any God who is a deceiver (perhaps we call him Lucifer) we have the same power to cast him out as we did other falsehoods. Back in the "Land of Nod" where two and three were of a different color, there was a wonderful place for Lucifer to exists. If he comes here to deceive us that two and three do not make five, we simply send him back to the Land of Nod, because as soon as we learn something absolutely to be a falsehood and not depending the least on our extensions, we then have the volition to cast it out. Therefore, despite our doubtful corporeal existence, our non-corporeal thought process allows us to command "Lucifer, you are dismissed, and God shall not be a deceiver!"

Now it may have seemed just a game to us; that we even considered this counting process or thought that we could cast out error and deceit. But the ultimate goal in this discourse is of course to arrive at whether or not God exists. What then was the purpose of the above exercise in casting out error? The answer: it was simply to prove to ourselves in our status of doubt that we still do have the power to cast our error whenever it is incontrovertibly recognized. We can now use that power to move on to the bigger questions.

Now we are left with but two alternatives: God exists, or God does not, but we have used the above exercise simply to cast our error. Now we should try to apply the same process with our last two alternatives. But we must be equally able to convince ourselves whether other people exist or not. Since we now know in this reality the true essence of quantity (counting of things), we have placed a great deal of our trust and reliance on our extensions, such as those people down on the street. It seems that it would be a simple exercise to merely trust our thoughts that another human being outside ourselves truly exists, yet knowing now that everything outside of our thoughts is merely extension, making an infallible declaration of those people's existence is really just quite as difficult as declaring that there is a God.

We can look out our windows and indeed we can see the people down on the street, but as we said above, all corporeal things, even down to our very own physical existence is nothing but extension. What a step it would be to further declare absolutely that those extensions that we view are actually other souls that do also exist. Those people seem real to us, but they could also be a part of a god's deception. It could all be an act in play—a play designed to entertain our souls for some purpose, but to exactly what purpose we know not.

But comfort can be found in the fact that we can prove to ourselves that at least one other true spirit in the universe outside ourselves does exist and the proof of that is that we did not know how to count as babes; that is, we had to be taught to count. Someone or something had to teach us through our extensions. Then once we learned, the concept of counting, i.e. the concept within itself, no longer required of our extensions in order to be true and without deception. Two and three make five. We are not alone and are not deceived in this, for we have cast out the error.

Now we know for sure that at least one being outside ourselves exists because we have been taught one way or another, God or Man, but at least one of the two remaining alternatives is now true. Both cannot be false, we have cast out the idea that all could be false. But both could yet be shown to be true.

So now back to whether or not there is a God. Which type of thought do we now turn to in order to answer this question? Will it be volition, affection, or a judgment? Volition has worked well for the action to cast out falsehoods and it was our judgment that gave us the power to do so. Now, it was also easy to use our volitions to open our own eyes. It was easy by judgment to cast upon falsehoods that we have allowed falsehoods to be cast out. But as to the truth or error of deity, is seems we cannot yet be sure and yet we drive on, because it is only in judgments that formal falsity, or falsity properly so called, can be met with.

We have seen that if there is a God, that deity will not be a deceiver, but we have not established any power or volition within ourselves to be able to cast God out. Neither have we arrived at any judgment powerful enough to dismiss the possibility in our minds that the people on this earth may be without a God. We must decide which thought then to trust to take us to the next step. Our affections it seems have not yet been used and affections may well turn out to be what we need in order to decide. On the other hand, affections do not seem to be useful at all in coming to incontrovertible conclusions.

But as mankind can endeavor to obtain by degrees a more intimate and familiar knowledge of self and his affections, the knowledge of the opportunity for true companionship is no small thing when for many people, the possibility of isolation is truly one of the most feared of fears. It is no small thing therefore, to contemplate whether any being outside ourselves truly exists.

Now using the same logic as having taken away two of the alternative frameworks above, if we attempt now to also cast God out of this world, we would also necessarily have to have the power to cast out the existence other people. And as to those people we see on the street, even though two and three make five, we know that someone or something has necessarily taught us that it is so. Either it was God who created the world and set the framework for the counting of things, or those frameworks simply existed and only those people on the streets of our extensions have been quite responsible for bringing the ability to our minds to count them.

It seems we can either derive then that it is the people are who are real but God is not real; or another possibility is that God is real and the people are not real. Perhaps though, we might also consider both are real and both are necessary. Because we have already found it repugnant that we are lone beings in this world (someone or something had to teach us to count) if the people of our extensions are indeed on the street, then could we not be the extension of one or more of them? "I think, therefore I am" was previously proven as a postulate, yet it now seems that the "We think, therefore we are" is perhaps the more complete postulate from which to proceed here, even if we cannot yet derive for certain who the we is going to be.

Until this point in our analysis, there has not been one iota of proof that we could ever use an affection to cast out error or to cast truth onto any of our ideas. And there seems to be no such power to allow us to use affection, such as hope or faith, with such power to decide unequivocally the truth of God or of his falsity. Faith and hope are but affections on the sides of the same coin, opposite of doubt and fear. Falsity also arises when our ideas represent what is nothing as if it were something.

If we travel into the darkest cave on this earth and bring with us no candle, or at least having traveled into the cave with the candle and for a time we put the candle out once inside the cave, there will remain only darkness until someone or something will light the candle and/or bring light back into the cave. With this picture in mind, let us ask ourselves if we, like the candle, possess any power or means of the natural light required to cause ourselves to exist in this moment, and that same power to yet exist a moment afterward (relight the candle). Since we are merely thinking beings, if such a power resided in us, we should, without doubt, be conscious of it. For no power can bring something from nothing. Each cause must contain within it at least the capability of the creating its effect. So, we now know that we are dependent upon some power of being different from ourselves, as with the light, to turn have turned us on, i.e. created us as thinking beings, much in the same way that someone must light the candle in the cave in order for there to be light.

Next, it is perfectly evident that there must also be at least as much reality in the cause as there is in its effect. Whatever in the end is realized as the cause of our existence, it must be like us a thinking being, because no effect can come from a cause that is incapable of producing the effect. And yet, the only cause capable of producing a thinking being such as ourselves must possess in itself the idea and all the perfections we have attributed to Deity.

We might also ask whether this cause owes its origin and existence to itself, or to some other cause. For if this cause is self-existent, it follows then that this cause is God; for any cause that possesses the perfection of self-existence, it must likewise, without doubt, have the power of actually possessing every perfection of which it has. In other words, all the perfections conceived belong to God. But if we owe one causes existence to another cause, then we demand again, for a similar reason, whether this second cause exists of itself or through another being, until, from stage to stage, we at length arrive at an ultimate cause, which will be God. Therefore, let us re-convince ourselves of the certainty of the following statement and with purpose and conviction; let us reconvene to tell ourselves: we are not alone.

Truth and Error

Although we have proven to ourselves the existence of a being outside ourselves that must have something to do with the cause of our creation, we have yet to even begin to understand the properties of that being. For while we have probably elevated that cause to some form of deity, we have not yet understood the nature of that perfection or of the qualities of such deity.

Perfection is the opposite of nothingness and mankind is caught somewhere in between. God is perfect and does not deceive, but mankind is yet deceived and is often found in error. Our existence depends on God, yet error itself does not depend on God; hence, error does not come from God. In order for mankind to have fallen from God, mankind himself had to introduce the error.

We think man's tendency to commit error is a defect and that man's ability to discern truth from error must be limited. Perhaps though, it is not man's ability to discern that is limited, but this defect is only due to the fact that error was introduced in the first place. That mankind had to be cast into the world for some purpose, which purpose yet remains perfect despite man's errors. Therefore, all things have their opposite and for perfection to exist, man must have fallen. This suggests that choice, or freedom of choice (which is discernment itself) is yet perfect because truth and error are but different sides of the same coin; which coin is discernment. Therefore, perfection can be found in the truth, which is discerned from error. Yet, perfection itself does require discernment.

Even though the perfect power of discernment may exist, that perfect power is not within mankind in general. However, we may choose to believe that men will simply not always use their perfect powers of discernment because that is their perfect choice. And that is not circular argument, but rather a simple statement of the fact that with an understanding of perfect choice, we realize that sometimes we will choose to use that power correctly and other times we will not.

Then back to the existence of God, we must consider all God's creations, not just mankind, because our imperfections as individual beings may be made perfect by grouping the intelligences together. In other words, we can think of Deity as an all knowing individual, but we must also acknowledge that if all of the intelligences in the universe were taken together, they could also contain the complete intelligences of the universe.

Where then do our errors come from? They arise only from our choice not to constrain ourselves, that we do not restrain free will. Our will to choose, offers such a great range of understanding, that will itself extends to things greater than our understanding. Freedom of choice in and of itself is indifferent. Free will itself is not susceptible to falling into error and sin by choosing the false and deceitful in place of the true and honest, evil instead of good. It is our use of free will that allows these errors to creep in. The use, or misuse, makes the faculty of will (the freedom of choice which we experience as our ability to discern) to be perhaps the greatest part of self that truly takes us beyond all the possible adventitious discoveries perceived through our extended senses. Although we then cannot be free from error, we can do what we must to arrive at the knowledge of truth; for we assuredly can reach for the truth if we only fix our attention sufficiently to those things we know to be true without any chance of deception. We must separate out those things which we conceive more confusedly and obscurely. So, let us list now some things we know for sure and then return to the meditation:

1. We know that we exist, because we know we are thinking beings.
2. We know that we are not alone.
3. We know that God is not a deceiver.
4. We know we have the choice to cast out deceit when we absolutely recognize it.
5. That same freedom of choice allows us to fall into error and sin.
6. We are not perfect, but retain the ability to never attempt to judge truth where it is not clearly known, therefore we have the ability for perfection line upon line.

Since we are able to derive these things, it leads us to presume that we ourselves actually bear a certain image and similitude of Deity. We have a certain small glimpse into what the properties a perfect and majestic Deity may possess, but we can also focus the ability in our minds, or spirit if you will, for using our volitions, affections, and judgments for uncovering the truth or falsity of many things.

Properties of Material Things and the Properties of Deity

When we seek to prove the existence of material things, we also seek to prove the existence of God. For if we find that material things exist then we must also find their cause to exist. And if their cause to exist turns out to be more than merely our own imaginations, then there must be another cause which is at least as capable as that effect, which is the entire reality of our universe. So, when we refer to that power which is the cause of the universe, we call that God, even if we have not yet determined the properties of such a Deity.

As to the material things, material things in and of themselves neither teach us truth nor deceive us, yet we cannot exactly ascribe to their existence because they lack any exactness or precision. Yet they do exist even if not exactly and therefore any we discover, with the aid of our ideas and pure intellect, we recognize them as true things; and now we can say without reservation that all that is true is something. Thus, even if we do not yet know what that something is, we can still say that something exists without knowing all of its properties.

Therefore, when we say material things, we may refer to the physical properties of the things or simply to the conceptual properties of the things. A polygon for example is an object made up of lines. A three sided polygon is called a triangle. Yet, what is a line where there is no exact measurement for it? And what is a triangle, which is made up of these non-exacting lines? While we may not produce any exactly measured triangle, just as in any of the non-corporeal ideas we have spoken of above, a triangle is yet a conceptual model for which absolute truth of the concept can be known, i.e. we can count the sides in our mind and when speaking of a triangle, always come to three when pertaining to the number of sides. We can shout out to the people down on the street, "how many sides to a triangle?" And despite, the reaction that they may think us crazy, if the answer comes, it will still be three.

Thus we discern that the idea of a triangle is not totally factitious depending simply on our own thought to create it; but that it is the representation of a true and immutable natural object. Like the act of counting and all the precepts found in any pure mathematics, the concepts themselves we can hold to be true and that they exists even if their corporeal applications are less than sure.

Then, like the triangle, let us also experiment to consider the properties of a Deity capable of creating the framework from which we imagine all these truths and fictions. If we think of God as a person, just like one of us—just like mankind has often chosen to consider God, we have not yet developed any means by which we can either eliminate or confirm that image for God.

Because we normally conceive of God as one perfect being and perfection is something we are not capable of fully understanding, we must work forward through the framework created only line upon line towards our understanding of deity and to whose essence the idea of a God necessarily pertains.

When we think of those properties pertaining to the essence of God, it seems impossible to conceive two or more gods of this kind because even if we could call upon and see more than one personage or entity, the infinite reality of our universe is one large infinite effect. The causation of such an effect may come in parts, but the whole of it can certainly be thought of as one encompassing causation; and it being supposed that one such God exists, we see that God must have existed from all eternity. Time is incapable of being an effect without a cause at least as capable of creating it. Thus, there are many properties of God which we can neither diminish nor change.

Yet we know that if we release ourselves from trying to discern all the properties of Deity, we can know that God exists, God does not change, and that God does not Deceive. And just like the properties we know of the triangle (that the sum of its three angles is always equal to two right angles and that in a right triangle, the squares of the lengths of the two adjacent sides is equal to the square of the hypotenuse, and so on) we find that the truths of the properties are found to be more exacting in our minds (we are capable of proving them) than is the existence of any actual corporeal structure of the triangle. Likewise we can know of the existence of God without knowing all of God's corporeal properties—that is if God indeed does have any of those properties.

In our existence (perhaps unlike in the Land of Nod, or anywhere outside our existence that God may reside) time is an essential element in our ability for experience. For what is something that has no moment and what is a moment with no prelude or persistence? So, if time then is a necessary element to our existence, time is that framework from which we perceive of God, just as much as non-corporeal conceptual model for the triangle turns out to be the framework from which we perceive the corporeal triangle.

Therefore, we can derive the same argument as for the existence of a triangle to the argument for the existence of God. The exacting of properties for God in our corporeal existence are not defined and therefore somewhat unattainable, yet the thought and idea of God as a perfect and majestic being capable of the time and space framework for causation of the universe is clear and undisputable. That is that the properties of God in our existence are as follows: God exists and the whole cause of God's existence is as infinite as its effects.

Existence of Material Things and the Distinctions of Body and Spirit

As we said, we can easily imagine a triangle as a three-sided object. Even if we cannot completely quantify the lengths of any one side, it can still be imagined and therefore, in essence, it exists. Then if we try to imagine a chiliogon (the thousand-sided polygon) it is difficult even to precisely picture all thousand sides at one time. Does the concept of the chiliogon then become any less real than the concept of the triangle? We can imagine it by simply drawing our attention to the counting of sides. Thus, there is a difference between pure imagination and pure intellect. In order to picture the many sided polygon, we need the imagination, however, to simply count sides, we only require pure intellect.

Even if we cannot fully trust our senses, those objects which we perceive with our senses in no way can all have been simply imagined by us. The mere characters of many of the corporeal objects, which we observe immediately, appear far too complex for us to have simply imagined them all by ourselves. Those corporeal objects then must have been caused by some other objects or some other entity and we may also suppose some sort of similarity between the cause of those objects and the objects themselves.

So, at first glance it is easy to think of all corporeal objects as real, but afterward we may have our faith sapped when we remember that we are so often deceived by our senses. We look at something far away and perceive it to be something completely different than when we approach for a closer inspection. Sometimes even a person who has had an amputated arm or leg, experiences the sensation of pain or itching in the limb that for them no longer exists.

Thus we discern that the idea of a triangle is not totally factitious depending simply on our own thought to create it; but that it is the representation of a true and immutable natural object.

Let us experiment then, to consider God as a person, just like one of us—just like mankind has often chosen to consider God. Let's reconsider: Because we normally conceive of God as one perfect being and perfection is something we are not capable of fully understanding, we must work forward only line upon line towards our understanding of deity and to whose essence the idea of a God necessarily pertains. It seems impossible to conceive two or more gods of this kind because even if we could call upon and see more than one personage, the infinite reality of our universe is one large effect with but one causation; and it being supposed that one such God exists, we see that He must have existed from all eternity. Time is incapable of being an effect without a cause at least as capable of creating it. Thus, there are many properties in God which we can neither diminish nor change.

If we will now recall to our minds the things above, which we have held as true, because perceived by the senses, and the foundations upon which our belief in their truth rested; we will, have to examine the reasons we still doubt them. Just as we have used faith to arrive at this knowledge, we will also use knowledge to arrive back at our faith. Then we will know what we ought to believe and why.

First, remember that we have perceptions and that there is no reason to either doubt or confirm the validity and extension of those perceptions, but we cannot doubt that within ourselves those perceptions exist. Thus, our perceptions are real, even if the things we perceive are not—and those perceptions can cause us either pleasure or pain.

If it was wholly within our own power to perceive them or not to perceive them, then surely we would avoid all pain. Yet, we experience both pleasure and pain. Therfore, we as beings exist in both a spiritual sense and a physical sense. The things we are, thinking beings, is not our bodies. Yet, our bodies are that which hold our beings. Our bodies and spirit are one in the same purpose, yet entirely different. It is this separation of body and spirit then that allows us to arrive at discernment of truth and error, lest if body and spirit were the same, all could just be a product of our own imaginations.

All the corporeal things of this world, then, are as real as the reality of this universe. There is nothing more real in this nature that the experiences we have of our own body and spirit. If we do not eat, we experience hunger. If we do not drink, we experience pain. These consequences we do not doubt, nor do we have reason to doubt. Cause and effect are true in and of themselves even if the corporeal aspects of those feelings remain at odds with our perceptions.

If I taste something and it is bitter or if I then taste the same thing and the next time it turns sweet, doesn't there still remain the taste. The taste itself does still exist, no matter what my interpretation. Nature teaches us to shun what causes the sensation of pain, and to pursue what affords us the sensation of pleasure, but those things our senses perceive to which cause neither pleasure nor pain, we choose to ignore. They don't excite us in the least way and we as human beings are limited by our senses in our understanding. We are less than perfect and left to question why God would have made us so.

So, then let us stop doubting. Faith is the believing of things which we have yet to perceive, but faith can also be simply the act of not doubting that which we have yet to prove false. Just as we consider the deception of our dreams, shouldn't we also consider that our waking times are most certainly at least a different state of consciousness. Isn't it unquestionable to us that we know the difference when we are awake?

I think, therefore I am . . . and, we think, therefore we are. In this we are not alone. If God exists, then He is no deceiver and the material things that we perceive are real. To all those things we have discussed and which we can fully comprehend as truth and right, without equivocation, to all those things we are not deceived.

The Physical Existence of Matter and Energy

The 20th century physicist named Einstein contributed more than any other scientist to the modern vision of physical reality. His special and general theories of relativity are still regarded as the most satisfactory model of the large-scale universe that we have. Einstein was physicist and a mathematician, perhaps. He observed things and applied mathematics to quantify and explain his observations. An engineer, Einstein definitely was . . . a pragmatist who discovered equations that could correctly explain or predict. A metaphysicist, however he was not. Oh, he may have had more than few thoughts and comments on the metaphysical, but he was never one to publish anything that couldn't be independently corroborated.

A meta-physicist or ontologist (one who studies the essence of "being" or what is "real") accepts that although nothing can be precisely measured, it is all still very real to us . . . else we do not exist at all. Perhaps Descartes, the scientist and philosopher, put it best. As he was searching for the first basic postulate from which all else must follow, he has been credited with developing the postulate, "I think, therefore, I am." He was the first to really understand the beginnings of the metaphysical. Obviously to Descartes, something had to be real or else he wouldn't have been able to contemplate it.

. . . recall the corny anecdote about Einstein, the physicist, arguing with, Pythagoras, the mathematician at a highschool dance party. Pythagaras insists that if he walks half way over to a very cute girl on the other side of the ballroom, and then halfway again, and repeats this process for an infinite number of times, he will never reach her. Meanwhile the Einstein is already more than halfway across the ballroom, turns back to the mathematician and says, "Yah, but I can get close enough."

In 1961, the Estate of Albert Einstein published a book called Relativity, The Special and General Theory, which was touted as "a clear explanation that anyone can understand." In that book Einstein used his popular explanation of the railroad carriage traveling along a track to explain the apparent incompatibility of the propagation (transmission) of light with the previously understood physical laws of nature for the every day objects around us.

Einstein used his example of a traveling railroad carriage to help explain the differences between the relative motions of objects one might perceive from the embankment (the ground next to the tracks) and those a person might perceive while actually traveling on the carriage. Einstein observed that those differences create a mathematical conundrum that can't be fully solved by applying the Lorentz transformations alone (time dilation and length constriction; more about that later). But, Einstein showed that those differences remain unsolvable unless you accept the applications of Maxwell (father of electro-magnetic spectrum) and Einstein's theory of special relativity.

Einstein's way of explaining these apparent conundrums about the behavior of light transmission on the traveling carriage often gets confusing even to some of the brightest minds on the planet. Even though the concepts were actually quite simple, I think the problem people had in understanding Einstein was that he made it all so simple that no one could just accept that something so profound could really be that easy.

Since, it seems that people need something more elaborate, I would like to modify Einstein's railroad carriage model with only a slight difference, by putting this railroad car into a film setting for a 21st century action thriller; this way we have the observer (being you) ultimately seeing the "behavior of light" in a much more familiar way by means of a 21st century perspective; it will be told as captured by the main camera on a movie set. If you are a real 21st century human, you can very much understand what you might see on the "boob tube" (i.e. television).

The concepts, as you will see, are still quite simple, but if people understand movie scenes, my version of the story is elaborate enough that you just might get the simple concepts and not be confused by how easy it is. But remember, in order to do so, you will have to read the next few paragraphs very carefully, so that once you understand the complicated scenarios, the conclusions will actually be quite straightforward.

Now, in this story, the directors in the movie have set up an elaborate stunt. Ramps are set up on a divided highway just perpendicular to tracks on either side of the highway (two-lane) at a railway crossing. The train carriage is traveling down the track at a high speed and two speeding automobiles are traveling perpendicular to the track on either half of the divided road traveling in the same direction and shooting at each other with bullets (I know you've seen this in movies before and it really is just two cars traveling high speed in the same direction while shooting at each other across a divided highway). The real stunt part of this scene, however, occurs at the railroad crossing. Whereby the stunt directors have set up ramps and one auto attempts to jump the track in front of the moving train car, while the other auto attempts to jump the track just behind the moving train car, but certainly in front of the next train car just behind. The tricky part of the stunt is that neither car gets hit by the train: that is the object of our stunt.

Now you need to know more about the plot. In this scene, there is a distractingly handsome devil riding on the train carriage right in the middle of the car. He obviously is the hero of the story and the bad guys are always out to get him. As with most of these movie plots, there happens to be two of those bad guys; bad guy number one is in the train carriage just behind (i.e. based on the direction traveled) and bad guy number two is in the train carriage just in front (again based on the direction of travel).

Just as the two automobiles we just talked about are simultaneously in mid air jumping the railroad track . . . (of course Einstein does not believe in simultaneity, but he uses it in his story, so I'll use it mine). But, just as the two cars are in mid-air passing the train car, the occupants of each automobile fire an exactly equal caliber bullet from exactly equal model of gun, at the exact same time, at each other . . . . Now that is a very elaborate scenario, but given our 21st century fixation with the motion picture entertainment, it is one that hopefully most people can visualize.

The part of this scenario that relates to Einstein's Theories of Relativity is the third bit of information here. The bad guys, who are also traveling on the train, who also hold equal model guns with equal caliber bullets to those in the automobiles, step out into the causeway between the train carriages and see our hero.

Just as the automobiles are flying through mid air and firing shots, at that very same instant, the bad guys duck (as not to be hit by the automobiles flying over their heads), and also simultaneously with the automobile shooters, each fire a shot at the same time. Now, all four players: the two guys in automobiles, one just in front of the carriage and one just behind the carriage; and the two bad guys just below the automobiles; all fired their shots at the exact same instant with bullets that should all have equal weight and velocities coming out of the gun chambers.

Our hero, the occupant (passenger) standing on the train car right in the middle of all this at the precise time the bullets are fired, is most certainly going to be the unfortunate innocent victim. As a result of the fired bullets, he will be standing right in the line of fire. But as with all movies, I won't spoil the plot here to tell you how the hero manages to escape with his life, which is for another discussion. For this story, we will just turn to the different possibilities we have created for the four bullets and how long it will take each to arrive at the center of the train carriage.

The interesting thing is that, now, even if all four bullets leave the gun chambers at exactly equal velocities at the exact same time, we have exactly four (4) different states of motion with the four different guns, equidistant in relation to our hero.

Einstein would explain that for one of the bullets, the bullet shot from the automobile which the train was traveling towards, would necessarily hit the passenger a fraction of a second before any of the next bullets. Why? The difference in the time it would take for the bullets to hit the occupant of the train would be caused by the phenomenon we have when a person standing in the middle of a traveling train carriage is at the same time traveling toward two of the shooters, and yet traveling away from the other shooters, but only one of the guns as the shots are fired is moving in the direction of the train. (In case you haven't gotten this yet, the shooters in the automobiles are certainly moving, but only in a direction perpendicular to the train; not in the same direction as the train)

If we are just looking to all the players in the scenario who are traveling together (that is the hero and the two shooters on the train), we see that is the easiest solution. Both of those bullets should hit our hero at exactly the same time. While the hero is technically traveling toward one those bullets and away from the other, all of the bullets shot from the guns moving with the train have no awareness of this movement or even the slightest affect because of the scenarios. That is that the shooters and the hero are all traveling with equal velocity. In other words, the shooter coming into the causeway from the train carriage in front of the hero holds a gun that is traveling in the same direction as the heroes is the shooter traveling from behind. We could try to imagine adding or subtracting each of the velocities of each of the bad guys as compared to the ground below them, but that isn't necessary because all of the players are moving together. For all practical purposes they are stationary in reference to each other, as is the air inside the train carriages: the outcome is the same as if they were simply standing on equal ground. Look at it this way, because even though the earth is spinning, when all players are moving together, they will experience things as if all are stationary. So, just like we all seem to be stationary standing on the earth, even though the earth moves, both of those bad guys as well as the hero on the train, are all stationary to each other. (Ever wonder why a bug that flew in the window of your car doesn't have to keep flying 65 miles per hour just to keep up with the car?)

But as to the automobiles, at any time between the moment the bullets were fired and when they strike, our hero would be closer to one automobile than the other. That would be because although the shooters were equal distance away from the occupant at the time of the shooting, at any moment in time from when the guns were fired and you imagine the bullets flying toward the hero, that passenger, our hero, would have necessarily traveled some distance in a direction along the track and one bullet, the bullet shot from the automobile behind the train car, would have to travel further than the bullet shot from the front.

So now if you don't get all of this yet, you might go back and read the last few paragraphs one more time—or just look to FIG. 1 and suffice with this summary: There is a moving train carriage with an occupant standing in the middle. Four bullets are fired at him at the same time, two from the front and two from behind. One of the bullets from the front is fired from a gun that is moving with the train compared to the ground below and one from a gun that is stationary with respect to the ground below. The same situation for the guns fired from behind. The answer is that the first bullet to hit is the one fired from the automobile in front of the traveling train carriage, second is a tie between the two bad guys on the train, and last is the shot fired from the automobile behind the traveling train carriage. Without any of the usual physicist's mathematics, you should be able to visualize this result, even if you have to go back and read the scenario one more time. For the rest of us, now let's move on to Einstein's theories.

Now with all those scenarios, the conundrum in all of this, similar to what Einstein explained in his book, is that if the same experiment was done in a Sci-Fi thriller adventure movie with the bad guys on the train and guys with guns in the automobiles were all firing laser light at each other instead of bullets, the laser lights would all necessarily hit the passenger at the exact same time. Einstein, from the reading of his book, probably only considered the different situations of the guns firing from behind, one was stationary to the ground (he called the embankment) and one was stationary with respect to the moving train, but if expanded, we would still have the same results as to the speed of propagation of light.

It turns out that light behaves with "spooky" action. In other words, the speed of propagation (transmission) of light is not relative to the observer. There have been experiments to prove this fact. Speed of light measurements, as measured emissions from the fixed stars; have shown that they arrive at the earth traveling at the same speed no matter the season in which they are measured. One would have guessed that light would behave like the bullets in the above scenarios, but in the seasons where the earth's orbit takes the earth traveling toward the particular star light being measured, you would think the speed would appear to be slightly faster due to the fact that the earth is moving towards it. In the seasons where the earth's orbit had us traveling away from the star, it would be just slightly slower. Light, however does not behave this way. It has been confirmed even by the Hubbell Space Telescope, that the speed of light as measured in a vacuum is always the same. The only changes in the speed of light are dependent on the substances through which it is traveling (propagating). Therefore we know that light is a metaphysical phenomenon, whereas bullets are a physical matter phenomenon. Whether you are traveling towards light or traveling away, you will observe light speed the same no matter which way you were traveling. And the corollary, if the source of the light is traveling toward you or away from you, its velocity is likewise neither increased nor decreased because of its initial velocity. Einstein accepted the theory of Hendrik Lorentz (1853-1928), of a direct relationship between an objects velocity and the way distance and time are experienced by that object; also called the Lorentz transformations. In using Lorentz transformations, we merely adjust distance and time in order to account for all four light rays in the train car scenario hitting the occupant at the same time.

Although Einstein may not have fully considered the movement of the light source; he did consider how traveling toward light might also affect the speed with which the light was propagated. The results might be exactly the same as when traveling away from the light. Einstein would have theorized that the bullets in our above scenario would behave in a similar fashion to the light except for the fact that the speed of a bullet is nothing compared to the speed of light. Einstein didn't ask the question of whether the light shot from the automobile (stationary with the ground in relation to the train) and the light shot from the bad guy on the train (moving with the train) would somehow, "spookily" propagate (transmit) at different speeds so that all would arrive at the same time as to the observances of our hero, but the wonderful thing about Einstein's theories were that he and the people reading them began to really approach the idea of reality and what it is that makes the physical things of the universe appear real to us. The appearances are always relative to the observer, always.

The thing here that is still consistent with Einstein's theories is that no two observers will ever observe physical things exactly the like the other observer. But for light, they will observe the speed of the light exactly the same. It is precisely because they observe light exactly the same (same speed for light in all reference frames) that creates the conundrum because physical things should also behave differently when our reference frames are different. Therefore, Einstein theorizes (or at least confirms the theories of others) that there must be a difference in the way time and space behave for each observer based on their relativity to each other.

Einstein showed that reality is relative to the observer: no two objects can experience time or movement in the same way. If the atomic theory is right (we really don't know for sure, but if it is right) there is a whole lot of relative distance between the atom's nucleus and its electron valance shells around it. We can't even fully define what matter really is. Matter is made up mostly of empty space and the amount of any empty space can be infinite, at least we can't even get an exact quantity on it.

The Time-Space Continuum

But what is speed? All existence could be accelerating out of some "hyperspace" created by GOD. Is it centripetal in nature? (i.e. some kind of yo-yo string hanging on to it all) Or, is it just accelerating from "somewhere" which we cannot comprehend? (That part really doesn't matter because those are only questions of relativity)

Figure 2:
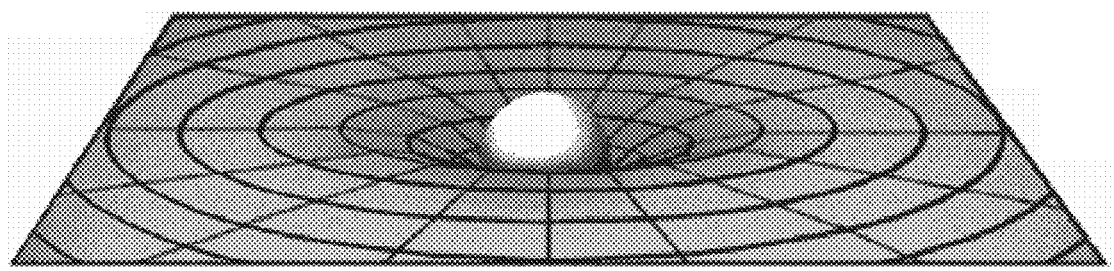
FIG. 2 represents a three-dimensional depiction of a four-dimensional "time-space" on a two-dimensional surface (sheet of paper).
Figure 3:
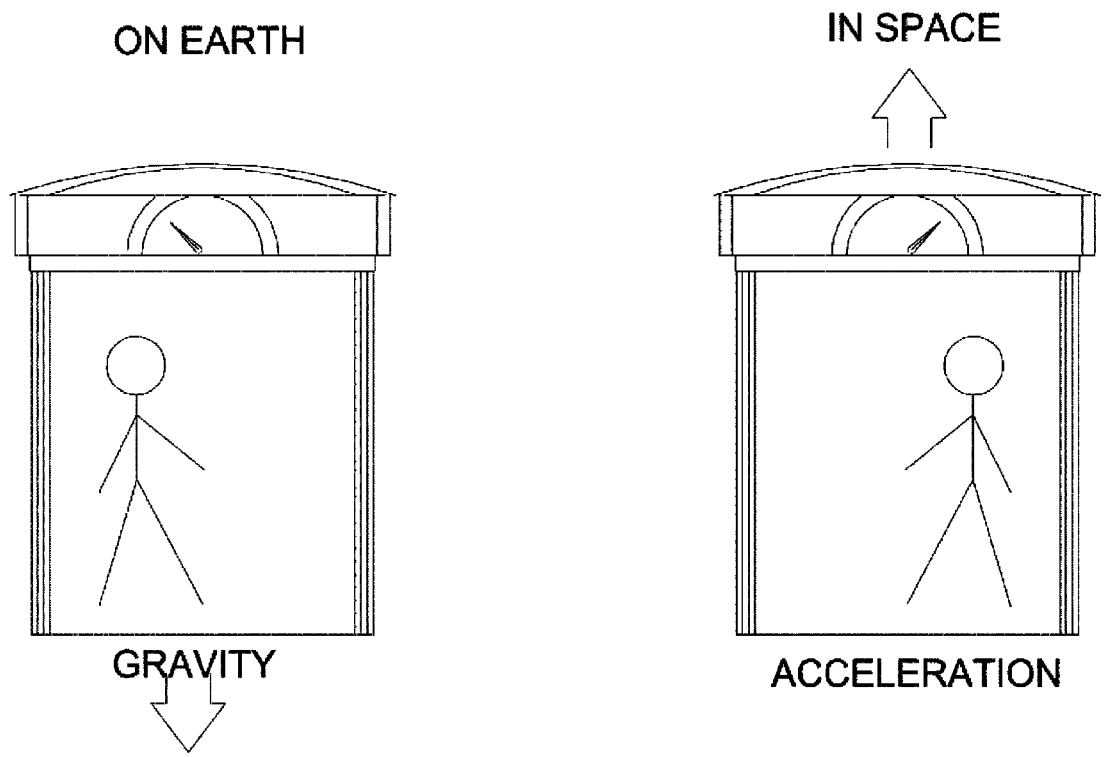
FIG. 3 depicts two sentient passengers riding in seemingly identical elevators. The elevator on the right is stationary and on the earth's surface representing acceleration due to gravity of precisely 32 meters per second squared. The elevator on the left is in space where the interior of the elevator provides breathable atmosphere and simulates all the observable properties to its occupant of the elevator on the earth's surface, only this elevator is actually accelerating into space at a rate of 32 meters per second squared.
Figure 4:
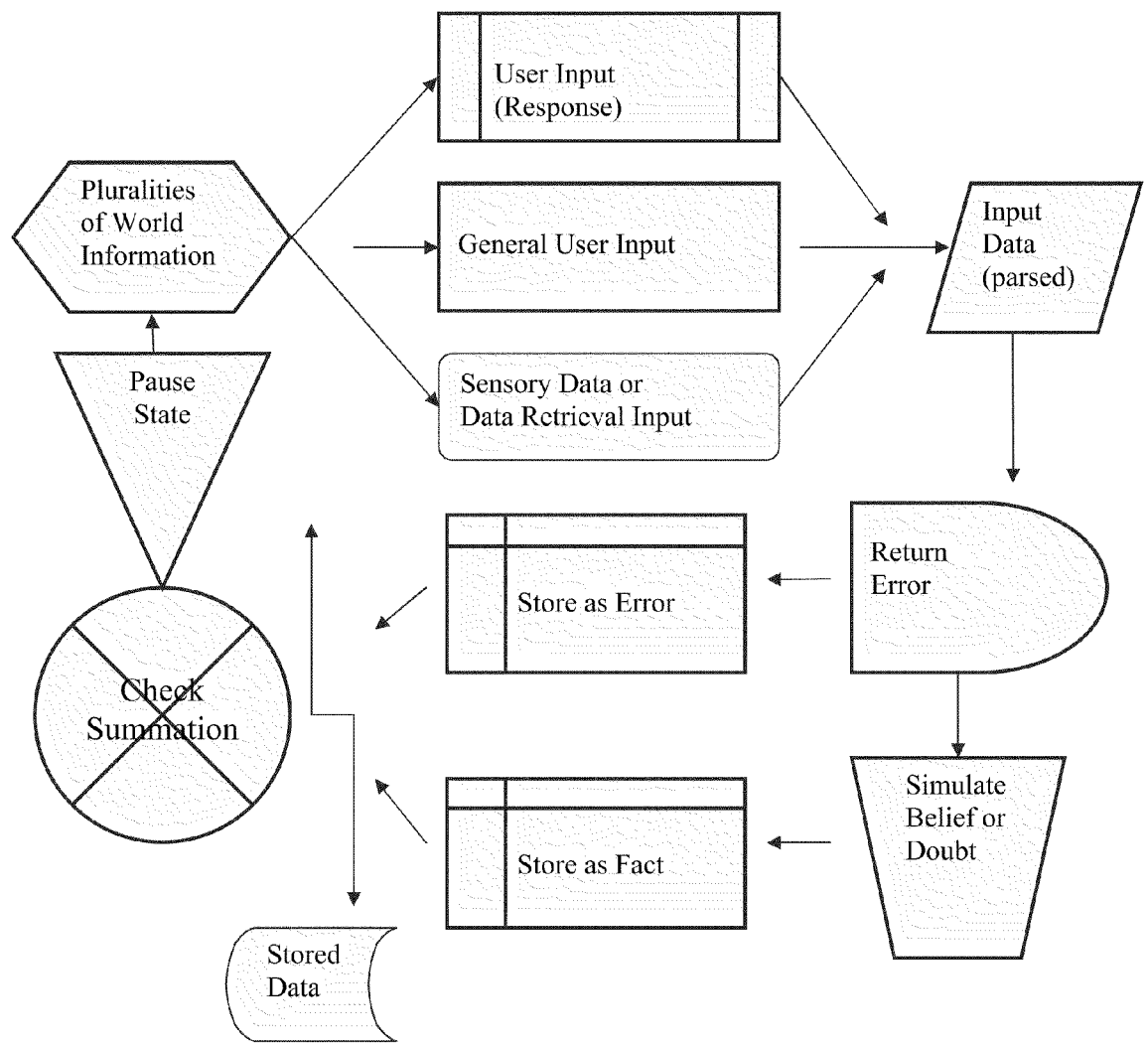
FIG. 4, the cover drawing, represents a flow diagram for non-computational intelligence.

Some commentators suggest that matter moves through a time-space continuum: See FIG. 2. Commentators on General Relativity say that Gravity is equivalent to a person accelerating in an elevator in space at 32 ft. per second per second. Consider for a moment that Gravity is not like or equivalent to acceleration. Gravity . . . is an acceleration. See FIG. 3.

Still some other more modern thinkers who were usually laughed at (Einstein was one, at first) thought there was some sort of connection between it all . . . although Einstein actually considered the picture above (the classical electro-magnetic theory), he knew the math didn't always work out correctly unless we use imaginary numbers. Whoa! Gotta love those "imaginary numbers.

Perhaps one day we will find out that the picture is right and the math is wrong. (Newton was once given an incorrect distance to the moon. He ran his calculations for his gravity formula and decided not to publish because the numbers were all off. A new corrected distance to the moon was eventually given and he found his formula for gravity was actually correct.

The only thing we really need to believe in order to begin to accept and understand general relativity is that all the velocities mankind can create or comprehend, at this point in our development, are so slow compared to the speed of light that the velocities we deal with are practically unintelligible. Yet we also see that gravity can bend light. The key to beginning to understand the Einsteinian view of physics is to understand the metaphysical nature of not just light, but of all things.

v/c=Very Small Number

Velocity divided by the speed of light (v/c) being a very small number, is often used to explain that Newtonian physics are all in error only ever so slightly. Modern thinkers in natural philosophy searching for the Great Unification Theory (GUT) tell us that Newtonian physics are not even at all in the slightest error; you simply must be in the same frame of reference in order to appreciate Isaac Newton. The only problem is that no two observers can ever be in the exact same frame of reference.

We must also understand that we have no idea about any kind of universal acceleration or velocity. We know that the earth is moving very fast in an elliptical orbit about the sun. We also know that the sun is moving in relation to the galaxy. We also know that the galaxy is moving in the universe. But is the universe moving?

Since we have no idea about a universal motion or acceleration, we can also glean from Albert Einstein's book that for all practical purposes we can only try to assume a universal reference frame. Whereby, if we assume the elliptical orbit of our planet about the sun is fixed in relation to the fixed stars (although the stars are not fixed; they are moving) compared to the great distances they are from us, our planet's rotation about the sun should be fairly fixed and that rotation should be presumed to be in a plane. In other words, the elliptical orbit . . . is elliptical, just as we observe. Scientific measurements assure this to be true for earth and all the planets with the exception of Mercury, but in the case of Mercury, the closest planet to the Sun, there is a second rotation of the orbit with the fixed stars that amounts to 43 seconds of arc per century where its planar rotation is also rotated perpendicular to its curvilinear rotation about the sun. As Einstein then theorized, we can go on to hypothesize that for all the planets including our own, not only does it rotate in an ellipse within a plane about the sun, but that the plane of rotation also rotates, but ever so slightly. We don't observe this rotation of the plane only because its rotational speed is so slow that it is merely not ascertainable. Thus, the rotation of the planets, in all actuality, more closely resembles those of the electrons about the atom than it does the ellipse that we see, but it is only the passage of time that clouds our abilities to perceive the second rotation—in that the planets act more like atomic valence shells than we thought. If we could only speed up time and see millions of years in just one instant, then for any planet we could see (it would appear to us) that a planet was not a spherical object in orbit about the sun, but a spherical shell located about the sun.

Without a doubt there is some reference frame where we are all moving at the speed of light right now. There is another reference frame where we are moving at 6 million times the speed of light. In another reference frame, we are not only moving, but also accelerating! But in order for those reference frames to exist, they may be outside of my time and space reality. Logic, reason, faith, belief, thought, etc. are our only tools to use in order to quantify these things. And let us not forget that in our reference frame we are sitting relatively still. All else is relative.

Thus, we have the basis to begin developing beyond the "Einsteinian" picture of the universe and a basic understanding of why all matter and energy only come into reality in our universe through a "non-locality" (i.e. nothing is really here, but we exist here). Non-locality is the name given this phenomenon, but I prefer to call it "duality." Duality means that the thing we call reality comes from another place and we just perceive it here. It is not really here, but we perceive it as being here, really. I guess that means our bodies aren't really here either, but we know that our consciousness is here, that is if there is a here to begin with.

It doesn't really matter what we call it, but I don't like the idea of exclusivity: my existence is not a "non" anything, certainly not "non-locality". In other words, I am really here. This I know to be true. Therefore, something must be real here in this locality, so the non-locality thing just doesn't work for me. Duality, on the other hand, creates the impression that nothing really exists in any one reality, but that all reality requires a second place from which to propagate (transmit itself). Just because I don't have the instrumentation to detect the bounds of my reality from within my reality, doesn't mean I don't exist somewhere. Duality rather than "non-locality" is your supernatural connection. Those who believe in non-locality refuse to believe in magic. I, however, do believe, so I choose duality.

The "uncertainty principle," I think is also more consistent with duality than non-locality. Besides explaining why there are no exact measurements of both position and velocity, Heisenberg's uncertainty principle also tells us why nothing in our reality is exactly quantifiable. There are things that exist outside of what science and physics can perceive. The whole world is metaphysical; yet some things appear to us as absolutely tangible and real. I like the idea of duality because once we know that reality holds no bounds, we can go on to talk about reality; what is reality and why is it real? The uncertainty principle is a thing discovered in those huge particle accelerators where mankind likes to smash infinitesimally small things together to see what pops out. The principle is that in any reference frame from which we can observe, we cannot ever precisely measure both the position and velocity of a particle at the same time. Why? Those particles are certainly moving and they certainly exist in our universe. If they are there and they are moving, why can't we know how fast and where they are at the same time? The difficulty isn't with the particles; it is with our measurements and the language (math), which we use to describe its location and movement. That is why Einstein adapted the conventions used by Lorentz (the Lorentz transformations) to explain that time and distance must change according to the observer. Relative velocities and distances change according to perspective from which an observer can observe.

Now let us also consider that Einstein's theories of special relativity tell us that as things approach the speed of light, time begins to dilate, in other words time moves more slowly (We have experimental proof that the speed of light in any reference frame is constant, but don't forget that we have been observing the moving reference frames from our own reference).

Is it that time moves more slowly for those things moving? Or is it that time moves more slowly for us? The answer is simple. It only moves more slowly for us. I give that answer in complete faith and confidence, not out of scientific proof, but out of reasoning. I can absolutely imagine that we too are moving at the speed of light in someone else's reference frame somewhere, yet time moves exactly how we'd expect it to move in our own reference. Whether or not anything else could exist in that other reference frame, is immaterial to its existence. I can imagine it, therefore the other reference is there even if nothing else exists there; and it is my "real" reference frame that is moving no matter how stationary it may seem to me.

Thus the man who leaves his wife and kids behind to get into an experimental light speed rocket ship and travels for what seems like a few seconds at the speed of light; he comes back to earth only to find that he is now the only living Great, Great, Great, Great Grampa. Time moved more slowly for him.

Yet, isn't it another conundrum? Even if we use the Lorentz transformation equations, things still don't always work out. We saw the man get on his light speed ship and saw the ship take off. Did we not see the flash of light as he speed off into the night? Did not our great, great . . . grand children see the flash of light as he returned back to his home planet? To the spectators, those flashes of light would happen almost instantaneously (after all light travels very-very fast). How then could that same flash of light take so long to happen for him in relation to us? And what if he went faster than light, would he return younger than when he left?

It is no conundrum at all. It is that we have used our Logic, reason, faith, belief, thought, etc. to derive the boundaries of the thing we call reality. The true Grand Unification Theory (GUT) is that which comes from our gut, our gut feelings. Our spirit is telling us that we were created out of somewhere and by something else and that we have used our gut feelings to show us the boundaries of the reality in which we live. As our minds take the ride into the particle accelerator and we see that we have traveled into the infinitesimally small and we cannot define it, we have reached a limit to our reality. Then as our minds place us on the speed of light rocket ship to travel outward as fast as we can fathom, we also find that when we traveled, we have traveled outside of our own reality. Light is not the only thing metaphysical, but all things have both a metaphysical and physical nature to them: that is the duality of all things.

Without any math or formulas of any kind, we have explained that $E=mc^2$. All matter equals energy in a unique proportion related to the speed of light relative in our reference frame. In order to reach into this reality, matter must accelerate out of some other reference frame. Where is that reference frame? And who is making us accelerate out of it? And what about gravity?
Why does $$F = G\frac{mm'}{r^2}?$$

That is Newton's formula for the gravitational constant where the attraction of the masses of two objects (m and m') is related to the masses divided by the distance between them (r), which exponentially grows weaker as the distance becomes greater. Again our logic tells us that we are all made up of particles and that each particle by the above reasoning has some necessary acceleration in order to exist in this reality. For some strange reason, the more of these particles you put together, the greater the acceleration they need in order to exist in our duality (they add to each other). Thus the big ones (like earth) catch up to the small ones (us) in exact proportions to the number of particles we have and how densely they are packed, but the farther away and fewer particles we have, the less acceleration (or attraction) we have toward one another. (I knew I shouldn't have had that extra piece of banana cream pie).

Accordingly, in the unity theory for reality, all the other things we observe, such as the matter, forces, time, and space, are simply those properties of space in which Space is merely exhibiting all of its wave-medium properties.

For me, the unity theory as a replacement theory for the universe is negated by the "I think therefore I am" proposition offered by our learned 16th century thinker, Descartes; I can't be an individual with the "Unity" theory of the universe. If I accepted unity, I am left thinking there is no existence of individual things at all. I am left with a lack of any diversity to the known and the unknown universe. For me in my duality way of thinking (rather than "unity") it seems more logical to simply deduce that it is our observances (our abilities to observe or lack there of) that limits us, which prevents us from seeing both the wave structure approach to universe in concert with the particle structure of the universe. Nether is totally correct, yet neither is wrong. Why do we have to choose?

So if matter and light all have this dual wave and particle nature existing as a non-local projection into our own reality, then what does that reference frame outside of our duality look like? For centuries we were sure that we lived on a flat world. It was surprising to many to find out that the earth was round and that the earth was also three dimensional. Perhaps there are yet other dimensions that we just have yet to discover. And even if we can hypothesize the existence of those other dimensions, we still might not be able to ever actually observe them. Does it look like the time space continuum? Or, is it the electromagnetic gravitational vector diagram? For this we cannot yet experiment to tell you, but my GUT tells me that it is a veil . . . a veil that was placed there for us to recognize but not to peer through. GOD placed it there! He is the creator and in time we shall see Him. And in another time we may even see Her who placed Him there.

Simple (Yet Non-Trivial) Additions of Velocity Experiment

So if we really want to talk about how time and motion relate to our reality we might have to turn back to relativity. After all, Einstein is still considered the greatest modern thinker on these subjects. But all the relativity theorists, I think including Einstein, insisted that even though it can't be tested, if a person in a near light speed rocket would shoot out a beam of light while they were traveling, they would necessarily have to observe that beam of light moving out very slowly from them because nothing in the universe can travel faster than the speed of light. The following experiment will prove that a finite speed for light (or any other matter, particle, or energy) is a fallacy.

EQUIPMENT:
1. 1 meter long glass vacuum tube
2. 1 Fizeau/Hertz type rotating wheel speed of light apparatus
3. 1 orbiting apparatus (like a space shuttle or orbiting space station with an orbit speed between 17,000 and 18,000 mph)
4. 1 human perception device (in this case the astronaut)

PROCEDURE: The astronaut/scientist on the space shuttle conducts the speed of light experiment and logs the data for his experiment that light traveled one meter distance inside the vacuum during a time interval of approximately 1/299 792 458 of a second; or in other words it traveled precisely 299,792,458 meters per second. (No, I did not conduct this experiment myself, but it none-the-less has been conducted)

RESULTS: The astronaut/scientists then on the ground decide to use the latest ISS or space shuttle trajectory data to calculate the speed of the orbit and has an amazing epiphany for the speed of the light he measured as calculated from the vantage point now on earth; the light actually traveled 299,792,458 meters per second plus 8,047 meters per second! (taking into account his speed while in orbit)

CONCLUSIONS: While this is a simple experimental observation, even most theoretical physicists would either have difficulty understanding the significance or would dismiss it as just another one of those weird anomalies concerning the relativistic approach to physics. What makes these simple results significant, however, is that while we must all agree that speed of light experiments show that the "observable" speed of light is indeed constant in all reference frames, speed is only a limit on our ability for observation; it is not a limit on the behavior or existence itself of any object or energy quanta such as light.

You don't have to take my conclusions in the experiment. Take the Princeton, N.J. physicists at the NEC laboratories, for example, who sent a pulse of laser light through cesium vapor so quickly that it seemed to leave the chamber before it had even finished entering. When in fact what really happened was that a particular pulse traveled 310 times the distance it would have covered if the chamber had contained a vacuum. The most probable explanation, however, was merely a feature of the energized cesium gas causing a velocity of an anomalous dispersion (i.e. the entire wave travels no faster than the speed of light but it included a group harmonic in the wave that traveled down the wave faster than light). Thus, the New Jersey experiment results would also agree that we cannot observe any actual light getting across the cesium vapor before it left, rather, we can merely observe the results of a pulse within a light signal moving faster than light; not that the light itself was moving any faster than it was supposed to.

The physical laws of light, therefore, can be viewed from both a quantum reality based reference and a relative reference (relativity). Again we have duality, but in this duality we are not talking about matter; we are talking about energy. Both have to exist in our duality, so both have to be subject to all the laws of this duality. The correct law about the speed of light, therefore, is not that the speed of light is constant in all reference frames; rather, it is that the speed of light is observed as constant in all reference frames. No matter where we are or how fast our instrumentation is moving in a universal sense, the difference between the speed of that instrumentation and the speed of the light in the vacuum will always be "c." (remember the moving train car scenario above). Thus gravity will bend light just like it will cause changes in momentum in matter.

Another example of this effect may be found in the experimental measurements of "NASA tracking of several outer solar system spacecraft—the 2 Pioneers, together with the Ulysses and Galileo missions—were all exhibiting 'anomalous orbital behavior' . . . indicating a greater solar gravitational attraction than current physics permits." The measurements were based on the "visual" tracking, i.e. the light that reflects off the space craft's hull. "The NASA tests, reported 'Doppler effects' on the tracking signals caused by the rotating Earth, as well as its own orbital revolution around the Sun." Which explains the error: Their calculations removed their own instrumentation—their "own orbital revolution." In other words, they should go back and recheck their calculations. The discrepancies for gravity and speed of light were there because of their own efforts to correct the instrumentation's reference frame to that of the rotating earth reference frame.

For future NASA scientists or any other physicists for that matter who are performing such calculations while using instrumentation that itself is in outer space or otherwise not in her same reference frame, the key thing she must remember is that any measurement device involving time, distance, speed, or gravity requires adjustments for time (time dilation) and distance (length constriction)—not just for Doppler effects. Doppler effects in light transmission are only as to the wavelengths of the light, not the speed of propagation. The NASA scientists in their correction for Doppler probably also corrected for anomalous wave dispersions, i.e. faster than light travel of anomalous waves within the light wave, which were not doppler affected. On earth, when measuring the speed of light, we always have the atmosphere, which will cause the speed of light to be constant inside the medium in which it travels. FTL (faster than light) wave dispersions exist all around and not only within cesium gas. Those dispersions in the space vacuum can be disrupted by entering the atmosphere when being detected on earth. In space, however, in correcting for Doppler, NASA actually removed something that was really not Doppler at all: they removed the anomalous dispersions and thus through off their calculations for the magnitude of gravity shifting for the light. I think it is safe to say that the NASA scientists did not discover a crack in the time-space continuum; they just discovered duality and didn't know it.

The metaphysical reference frame is the universal reference frame where God looks down over his creation. These NASA experts were correcting for the speed of propagation in the universe, but the speed in which an anomalous wave length travels down a light wave can be faster than light . . . and if another scientist wants to measure time, distance, speed, or gravity of something moving quickly (like quarks), she might have to accelerate her accelerator in order to track them. Who is to say which direction you want your accelerator instrumentation moving? It might be up, down, out, or around. I don't know, but I would begin with rotating my data retrieving devices around the point of the collision to see if I could view those little "buggers" that pop in and out of existence so fast that we can't see them long enough to get tangible information. (See law 3 below) . . . or if she wants to see the true behavior for the fringes in a different form of Thomas Young's famous double slit experiment, she might have to observe the screen while the double slits are moving together . . . or moved separately . . . parallel to the direction of the light . . . or in various directions.

Duality simply means that your 1 meter long vacuum tube in outer space may be one meter long to someone riding along with it, but if we were to take out our giant telescope and somehow with a very fine caliper measure it from here on earth, it wouldn't quite be 1 meter long any more. And as we looked at that clock on that ship, it wouldn't quite be ticking off 1 second of time; it would be slightly longer, i.e the Lorentz transformation. But one thing is for certain as a result of my experiment explained to you here today: just because we can't observe anything faster than light doesn't mean it can't exist. Thus we must accept the possibility that things exist that we cannot observe outside of our reference frame and that things are capable of moving "FTL" even if we do not ourselves have the capability to observe them. If we want to observe things as they really are, we need to make sure our instrumentation is in a reference frame close enough to the subject's reference frame to actually observe it at or near its own full spectrum reference momentum. Thus, there truly are "more things, Horatio, than can be dreamt of in your philosophy." William Shakespeare, Hamlet, Scene I Act V.

A person traveling at near light speed who shined a beam of light out from him would surely see the light shooting out normally. It is only the observer here on earth in a different time frame that would observe practically no difference between the near light speed beam of a ship flying nearby and the additional light beam being shot out. According to the "Lorentz" transformations for the pilot of that light speed ship, however, he would not get back to earth to tell of it for some many years later: time would pass more slowly for him. So now I will suggest that instead of trying to watch the light speed ship fly by us from earth, we just need to put a camera on another ship not moving quite as fast, but close enough to see the ship as more than a speed beam and then take its picture.

The New Laws of Light Speed

1. The observed speed of light in any reference frame is approximately 299,792,458 meters per second.
2. No mass, energy, or quantum particle can be observed directly by another mass energy or quantum particle that has a greater relative difference in velocity than 299,792,458 meters per second.
3. Where two masses, energies, or quantum particles are moving, spinning, or vibrating with velocities separated by greater than 299,792,458 meters per second relative to each other they must exist in a different quantum realities. However, a third mass, energy or quantum particle whose relative velocity is between the two may observe them both.
4. This duality is finite, but the number of dualities is infinite.
5. There is another reference frame in some reality that exists somewhere or sometime where this reference frame, you are in right now, is moving at the speed of light relative to that other reference frame.

The Religion and Mysticism of a Non-Virtual World

With the beginnings above, we can now turn to faith, or the "Holy Grail" of physics, because only through faith can we seek to unify all areas of physics into one simple equation. Metaphysics must then turn to religion, because believe it or not, there are no experiments to show you the metaphysical. By definition, science can only show us the physical realities of our universe. To delve into the physical "dualities" of our universe, we need to look to faith.

I will choose the Judeo-Christian idea of faith not because that is the one right religion or even that it is the only one that can lead us to the correct conclusions about the universe, but I choose it because it is the one religion that I am most familiar with. It is not the religion that I am concerned with in this undertaking, but the concept of faith. Absolute faith requires in the believing of things that are not known and are not provable through science, but may be proven when you use your spirit—that connection to the "duality" of our existence.

I imagine any faith that believes in something supernatural would work. The only religious requirement I have for the reader to move into this next section is an open mind that despite all the errors and religious misunderstandings about God (or whatever higher power you choose to believe) God is not incompatible with any discussion of the metaphysical. As a matter of fact, religion is by definition a discussion of the metaphysical.

In the time of my generation, there has always been a great deal of discussion and controversy over how the world came to be and the purpose of human kind. Many people speak with an assurity that the biblical story of creation cannot be correct, they would say, because the scientists have discovered the physical and natural evidence that dispel the "myths".

Well it is certainly true that the religions of the world have been infiltrated by a good deal of human folklore, but that folklore does not make the messages found in religion wrong. There can be great truths found within those stories that have been passed down for generations. It is all very much told like a parable. The characters in a book such as the bible, while they may not have done everything exactly the way it has been depicted, they were still real people with real stories and maybe, just maybe, God has had a hand in preserving some of those texts; not for the factual exactness of the events, but the exactness of the spiritual precepts taught.

I feel the need to write down some of my thoughts concerning the story of creation. For I believe that all of the physical and scientific evidence that man has found about the creation of the universe is merely further insight into the process of creation, but in no way disproves the true existence of an ever living God.

I find that the most natural way for me to impart my ideas is to tell a story. As I pour out these impressions, I am unable to tell it in any other way than in my own words. Contemplating creation is a complex process. In referring to scripture passages, remember that I am referring to Judeo-Christian concepts that others may find distasteful, unbelievable, incorrect, or all of the above. Even some Judeo-Christian believers may find my writing distasteful because it may seem quite a departure from the biblical story they have grown to understand. But, I often find it necessary to use paraphrase of Judeo-Christian scripture because it gives me a perspective of humanity that has been told in story for hundreds of generations through the bible and other religious texts. If you find the Judeo-Christian story offensive, I apologize. But if you would simply insert your own "story" of the creation (hopefully your version still contains some opportunity for belief in a higher power) then you will allow faith (metaphysical beliefs) necessarily aid in this sort of understanding to which we will be considering in the paragraphs below.

It is important for anyone reading these words to know that they are my own words through inspiration and not revelation. But, my words are certainly led by the spirit in my quest to more fully understand Gospel principles. It is my hope that by interpreting certain scriptures in my own words, I can draw a line of common ground for both scientific and religious versions of the creation of the world. It is an understood principle that each individual must draw their own conclusions from reading scripture.

Conceived in Hope:

Some scientists of this generation feel that they have recently made a most exciting discovery. The mystery by which the creation of the universe came about is very close to being unraveled. The best way we can describe this discovery is by calling it a "Big Bang", in which all matter that exists in the universe sprang forth through a central gap or fold in the time and space continuum. All matter that comprises the universe spews from this fold. Since energy and matter are one in the same only in different forms, the matter as is it is released into the cosmos contains enormous amounts of energy (it is very hot). Some scientists also theorize that this process is still going on and that the universe is constantly expanding and our galaxy is drifting away from that fold.

The making of this world is but one part in the story of the creation for there have been other worlds formed by the hand of God. And the substance of the world existed for all time also from the very beginning. For time is only measured by man. Everything is as one day to God. In the beginning everything was without form. Chaos was the world. And there was no world save it be primordial, for existence is an awareness that had not yet been formed. All was in a state of wait. It was as if each moment of every human life had already been executed, but the essence of each moment was scattered so far across that plain of primordial silt that nothing was able to penetrate, save it be one being. As the spirit of God moved across the essence of existence, a despair and solitude almost came upon the abyss, but the despair was shut out in hope. For, at that moment of hope, God became the word and the word was God, the Great I AM. And the world began. God was alone, yet not alone. There were a great many other spirits drifting along the primordial silt, but they did not experience the "I AM." If those spirits were to obtain the same glory as God for God to not be alone, Man was to be created in this beings image; then it follows that we were to be like him.

Descartes taught us his postulate, "I think, therefore, I am." Thus any Supreme Being must have passed the same test, only before the world began, and we also in this world must pass this test, the test of the "I AM." If there is a God and God created the Universe, then that God also had to come into being somehow. Thus, the demarcation point from which all springs, we can now refer to as "The Great I AM." God looked upon the intelligences that were formed and he knew that it was good. And as he looked upon those intelligences that were organized before the world was, he saw that among them were many noble and great ones. And as he looked upon those intelligences he bid them to go out and make worlds, so that they too might learn the word of God and become the spirits that would prevent the despair from returning.

The first of the intelligences to answer indeed became the Firstborn. For it was the first one to recognize God. He looked out upon the spirits and said "This is our father and we are all of him for he is the word and the word is God. We will do whatever is the fathers will, for it is only through the will of the father that we will be. If the father will it that we return to the despair, then to the despair is where we will go. But, the father has asked us to make a world, and thereby providing us a method to take us away from despair and bring us to hope. Where ever my father commands me, I will go." God Spoke to that intelligence and said, "I also have seen now that you are in me and I in each of you. You have been the first to recognize this truth even as it is before I have shown it to you. You are indeed a savior to the assembly of spirits before you and have rescued them from the despair and in doing so have rescued this world. You will be the first born. It is through you that all can now be created."

But what does God look like? Is he just a blob of light or some intangible supreme force? The Judeo-Christian version of God has him as a male personage. But some modern religions also take in the concept of heavenly parents, both a mother and a father. If God does look like us, then it would be consistent with our hope that we might progress spiritually and one day become like him. We were conceived in hope and we cling to hope. The only problem with the "created in his image" idea that I see, is that I don't know what exactly is that image?

Does he have dark skin, or light? Is he fat? Tall? Pretty? And we certainly don't all look like him, because we all look a little bit different. That image from which we were created (looks) is merely relative to our own perceptions anyway. Even man's height and stature has constantly evolved over time. Records clearly show that the average height of mankind is a great deal taller than he once was. So, is God then the short man with dark skin, or is he a tall freckled fellow with a receding hairline? I am most amused by the portrayal of Jesus as a Scandinavian blonde haired blue eyed man with a flowing beard. I'm sorry, but it escapes me how a Scandinavian happens to be born in Bethlehem. But let us continue in the story of creation.

The next of the intelligences to answer was boisterous and loud. This was an intelligence that had been in waiting, for it had already been consumed by the despair even before the event of creation. Because it had learned about the despair by itself, it would not accept hope and would not accept the "I AM." It would not even become of the word. This intelligence looked out on the spirits and spoke unto them saying "This is not our father for we all are eternal in our existence. We did not need his knowledge of our existence to become a part of His existence. I do not need God to bid me, go and make worlds, for the essence of these worlds has already been formed, they are ours for the taking."

God spoke to that intelligence saying, "This thing that has been spoken, will from now on be called evil, for it is despair that it seeks." As God looked out over the firmament he saw the entirety of things that had no limits of what could be brought forth; for indeed, all things were possible. He organized a beginning. And all that was to be done, would be done in order, the first to the last. For all things would be done according to the needs of those spirits who followed the first born and were a part of the Father. Their needs being to escape from the abyss and bring forth a means in which to fashion themselves after the Father in his image.

And God commanded the First-Born to organize the matter into worlds according to the needs of those spirits that they might gain eternal souls. He commanded him to separate things of substance into matter and things of power and light into energy. Many worlds were organized and the universe assumed shape and motion.

Yonder is Matter:

Scientist say that the universe began 10 to 15 billion years ago and that the earth is approximately 5 billion years old. Some say that the earth actually broke off as a burning piece of matter from what now makes up our sun, and that all the planets as they broke off and began to orbit around the sun slowly began to cool. Recent observations of venus, however, suggest that it was once cooler than it is today and that it was the sun that boiled away her oceans. Many scientists now believe that all the planets were part of a swirling disc and it was the sun that condensed in the center and began to produce the intense heat. On Earth, steam from volcanoes condensed into water clouds. For a million or so years a torrential downpour descended. Erupting volcanoes on the early Earth created the chemicals from which the first organic molecules were formed.

God commanded Jehovah to take one of the souls chosen of the Father as a companion and to go down to organize one piece of matter to form a world. This world Jehovah called Terra (Earth). He would organize the motion of this world to create a continuity of time and relativity. No matter how fast the heavens moved the velocity of light would always be the same. Light became the original gift and time became measured by it. During the time that the world would view the brighter light would be day and during the time of the less bright light would be night. Yet the light would be separate from the matter. The matter could only be perceived as physical, the light would be metaphysical, but both would exist in duality of each other.

He also put water on the earth so that along with the light, water would provide the requirements for life. And then he separated the dry land from the water to create an expanse between the oceans of the world. This was the most substantial task of fashioning the earth, and took longer than any other period of time in the creation of the world as measured by the number of earth's rotations about the sun.

The Breath of God:

Scientists can date organic materials through a process called Carbon14. All organic materials contain carbon and all living organisms acquire the Carbon14 isotope from the atmosphere during their life. Upon death the isotope begins to decay at a known rate, so that a sample of the material can later be tested for the amount of Carbon14 remaining and thus determine it's age. Since there is a point when there no longer is enough Carbon14 to measure, there is a limit to how far back one can date materials. Even under the best situations and providing for contamination, the oldest dated materials using Carbon14 are 50,000 years old.

Another technique that has been developed using similar principles as Carbon14 is known as Potassium/Argon or K40/Ar40, which can date back several million years. However K40/Ar40 can not date anything younger than approximately 300,000 years. Ironically, there is still the problem of dating materials between 50,000 and 300,000 years which could be the period that will ultimately answer many questions about mankind's development.

. . . Jehovah returned to the Father and God questioned Jehovah and the companion that he had brought with him about their progress. Jehovah replied that they had done as he had asked and that a great measure of time as organized had passed and that the world was now ready for what the will of the father would have for it. The Father said of what had been accomplished that it was good.

God commanded Jehovah to produce vegetation on the earth, to plant seeds of all kinds on the land and in the water. And that the plants that grew there of would bear all sorts of fruit according to the various kinds. Jehovah and the companion returned to the earth and did as the father had commanded, and then returned to the father to again report of their progress. Jehovah and the companion, the chosen spirit, returned to report of their progress. The planting of seeds was completed in a very short expanse of time as compared with the forming of the earths crust. God was again pleased with their efforts and replied that it was good.

Motionless:

Scientist know that the speed of the earths rotation has been fairly constant; but that the tilt of the planar rotation may or may not be so constant (remember the Planet Mercury example given previously). The ice age for example could have been caused by an interruption of the tilt in earth's rotation about the sun, perhaps by a meteor. Or perhaps, it could also have just been the mushroom cloud that dispersed in the atmosphere after the hypothesized great meteor strike; but if you think about how as children we played with a top, you will remember a rotating top works much like the earth. When first sent in motion a top rotates fairly up right. There are a few quick wobbles and then the top settles into uniform undulations.

The Earth's rotation on its axis probably does not undulate like a top because unlike the top, it does not sit on a table. Again we have not a universal reference frame, but in relation to other celestial bodies, it is more like the top in that the earth's axis is constant, but as it rotates about the sun, it is merely not perpendicular to the sun which creates the seasons. As we in the Northern hemisphere are closer to the sun we experience summer; and when the southern hemisphere is closer, we experience the winter. Imagine yourself walking around a campfire; the heat is always coming up from below you. But if your campfire were in the middle of a sloped incline, as you walked on the lower portion of the incline below the fire, you would feel the heat about your head.

Set in Motion:

. . . . God commanded Jehovah and the soul that he had brought with him to return to the earth and to organize the days and nights, each into different lengths to mark the seasons. The time of longer nights to be called winter and the time of the longer days to be called summer. He also commanded them to place a gradual changing of the day and night cycle to serve as signs to mark seasons and days and years. Jehovah and his companion placed a time to come after winter when the days become longer and called it spring. They also placed a time to come after Summer when the days become shorter and called it Autumn. These seasons would add variation to the beauty of earth's vegetation and other physical characteristics and place the earth in a constant state of change.

Teeming with Living Creatures:

Scientists know that many species of plant and animal have evolved over many millions of years. Creationists feel that evolution cannot be true despite the existence of thousands of pieces of fossil evidence to confirm the process of evolution. Some people say that species today are the same as they were in the beginning, because God created them all.

But, these people distort the beauty of creation by allowing their own concepts to overshadow the true scientific as well as scriptural fundamentals of creation. It is "scientifically" based that all animal life on earth began as simple single celled creatures. Certainly, there was not just one lone living organism, but many were formed from the billions of organic molecules that floated in the rivers, lakes, and seas. For it is the vast variety of life on earth that makes it a most precious planet. Scripture does not deny the process of evolution and people should not corrupt scripture by adding their own interpretations about evolution. The patterns from which God works are infinite. The family tree of one species will not lead to the family tree of another exclusively. Each species may have its own unique ancestry. The evolution and ancestry of mankind has had the greatest effect on this world than any other species.

. . . . And God said to Jehovah and his companion, "Let the water teem with living creatures that they may grow and develop into things of beauty." So, Jehovah and his companion returned to the earth and made all sorts of creatures. Birds flew in the sky, fishes swam in the waters. Some of the creatures were given gender as a means to reproduce themselves that would keep them in a state of change. While other creatures would be made to remain more constant things of beauty and could reproduce asexually, but that all should be fruitful and increase in number.

Jehovah and his companion returned to the Father to report of their labors. God was pleased with their efforts, but commanded that the companion whom was chosen of the father to accompany Jehovah should end his labors for a time. For God told Jehovah, "This spirit has seen the works of our creation and has become a part of this world. He is in us and we are in him and that will always be. But, he must now be made to forget what he has seen. He can no more look upon my image, so that the essence (potential) of both despair and hope will remain in him, that he may become the fashion for all those spirits who are a part of the assembly and are within me. Like him, those spirits shall know of the "I AM." And you shall remain within them so that they may become like unto us. As I Am, they will be. As you once were, I shall myself become. Thus the eternal nature of all things shall be made manifest unto each and every one of us. The first shall be last and the last shall be first."

Adam's Rib:

Archaeologists have unearthed a great many fossilized bones of ancient hominid species that resembled modern man, yet most of those fossils do not completely typify what we call Homo Sapiens, or modern man. Man has gone through many stages both physical and spiritual to have come to where he is today.

Many people of our generation have heard of a man named Darwin. They say that his theory of evolution states that man has evolved from the apes. Darwin wrote of such hypothesis in Origin of the Species, but the theory of evolution is not inconsistent with scriptural references to the creation of man. There are merely thousands of self asserted principles that have become popularized for people to rationalize God's handy work.

Creationists will deny that Adam was ever a child, that he was placed on the earth by God as a fully developed adult man and that he had no parent. This idea seems to lead to the conclusion that Adam is not "Begotten" of the father, although scripture would indicate that there is only one son begotten of God. This one was not Adam.

Perhaps, we will some day be shown that Man has evolved, and Apes too have evolved, but of separate evolutionary chains. Man need not concern himself with locating the "missing link". The origin of the gene pool from which the first man was born is a far more complicated scheme than fits the concepts of human imagination. Rather we should try to understand that each species including man has a deep and long evolutionary pathway that began in the diversity of the many one celled life forms that first inhabited the earth and evolved according to God's purposes in the eternal salvation of mankind.

. . . And God Said, "We will allow Satan our enemy to test and torment this soul that he will see the true essence of the despair from which he must rise up. But where we place this soul still in the midsts of despair, we will also place within him the hope. For we will provide a way for his return. We will provide a savior who is the first born of spirits. He will be the chosen one through whom all things of the universe have been created."

"We will make man in our own image. He will rule over the fish in the sea and the birds of the air, over the livestock, and over all the creatures of the earth. And we will give him an awareness of the knowledge to cultivate every kind of green plant for food, and to nurture every kind of plant that bears fruit with seed in it, and to all the beasts and creatures that move on the ground." And Jehovah returned to the earth bringing with him the soul that had been chosen of the father. This spirit had come willingly knowing for a time that he was of the father and that the father was of him and that a way had been provided for him to fashion himself after the father.

This chosen spirit watched as Jehovah began to mold the image of man. Over a space of time he commanded creatures to be brought forth from the sea to walk on land, and as the winds of the seasons change so did the creatures to adapt to every climate and landscape according to it's kind. And, some of the creatures began to walk upright as in the image of the father. It was in this period of time according to the number of earth's rotations that the spirit of the one companion was placed into this adult man and this man was called Adam.

In those days, Jehovah would speak to the spirit of man as he would later speak to prophets of the earth, and accompany him always lest he be alone in this world. But the man was unhappy as he looked into the faces of other upright creatures much like himself and did not see even a light or presence of spirit, and he cried out to Jehovah, "why must I be the only one of my kind, when surely other kinds have been allowed to spread abundantly through out the world. I ask of the, if it be thy will that I should have a help mate or a companion of my own?"

This humble request became the fashion for things to come. Deep sleep came upon the man. Meaning a removal of the spirit from the body for space of time counted in the number of earth's rotations. During this space of time Jehovah was commanded by the father to more fully perfect the image of man in the likeness of the father.

A piece of the body and bone marrow from Adam's rib was taken as a pattern for human kind and was placed in the body of both male and female, for both male and female he created in the likeness of the father.

Jehovah commanded these creatures of the earth to stand more fully erect and bear less fur on their bodies. A man and woman were born unlike any of the other living things and were set apart from the creatures of the world. When Adam awoke from this sleep it was as if in a new birth and a veil was placed over his memory of things that existed before this reality. And he awoke this time to find another creature to have the same attributes as he and a spirit as he, and that no other creatures of the world resembled their likeness. Also, that Jehovah spoke to no other creature, but only to them.

Jehovah had completed the work he had been doing. He blessed that day and made it holy, because on that day he rested from all the work that he had done thus far. Despite the veil placed over his memory, Adam still had a spirit which could speak to his mind to know of the alternate states of duality, or in other words, faith. Adam still knew of the metaphysical although he could not remember it.

Paradisiacal Glory:

It is often difficult for many to accept the biblical story of creation because of major physical differences between the way life was described by the ancient prophets and what we now experience. For instance, Adam lived for hundreds of years where as now the life expectancy of a normal male would be about 72 years. Remember though, that according to the Judeo-Christian creation, there were no vicious attacks from animals, no harsh weather in the elements, no sickness, no injury. It took place in the Garden. Everything contrary to what science tells us about the earth today, the earth paradise where the first man and woman came to being would have existed about twenty to thirty thousand years ago and had to have been on another plane of existence within our own, perhaps this was a reality different from the duality that we exist. This was also the state of things that scriptural accounts predict to be the state of the whole world that will one day return (i.e. The paradisiacal glory of the "millennium"). Yet, there are places of calmness amidst the turmoil even in our own world now.

Man easily forgets the fragile make up of what we call reality. Here in our visual, physical and electro magnetic dwelling place we can not see the possibilities of altered states of consciousness or existence.

. . . Jehovah had also planted a garden in the east which was called Eden. And Jehovah took the man and the woman to the garden to have them work it and take care of it. Jehovah wished it that the man and woman find for themselves their own simultude of the father and commanded them, "You are free to eat from any tree in the garden, but you must not eat of the tree of knowledge of good and evil, for when you eat of it you will surely die. For He who made the ordered world out of chaos and set the stars in their courses and made each plant to know its season, He can bring peace and order out of your private chaos if you will let Him. God is watching over you, too, to bless you and care for you. Out the darkness He is leading you to light, out of unrest to rest, out of disorder to order, out of faults and failure to success. You belong to God and your affairs are His affairs and can be ordered by Him if you are willing."

Jehovah again spoke to and accompanied both Adam and Eve in the Garden of Eden. He said, "Adam this is woman, she is to be your helpmate and companion. What name shall you give unto her?" Adam answered, "I shall call her Eve." Again Jehovah explained about the tree of knowledge and order over disorder, rest over unrest, success over faults and failure, exactly as he had previously.

But then by all Judeo-Christian accounts, something happened to Adam and Eve and they were cast out of the Garden. Because of their "fallen" state, they now had to live in a much drearier world where there would be hunger, sickness, pain, and death. The paradisiacal world was lost for a time, until mankind could one day return to be in the presence of the Lord. Until then, no man could ever again look upon the Father who commanded Jehovah to build the world. Reality had become the physical and spiritual duality in which we now all exist.

Horton Hears a Who and the CII

Now that we have studied light, matter, duality, and just one verbal tradition of how a creator could have fashioned a world, we must then further meditate on how to reconcile these new found understandings with the rest of our awareness. The first postulate at the very beginning of this article, which was that reality could be both a universal phenomenon as well as a personal experience (see Detailed Description of the Invention, $2^{nd}$ paragraph) caused us to question whether our realities could be different from one another and yet remain true for the both of us? And if indeed there is a creator of this universe, as our study of light and matter in this universe progressed, we came up with the postulate that there are possibly an infinite number of universes. How can the reality of this universe (as it appears to us as part of our spiritual and physical duality) allow us to interact at all with other spirits of this universe?

If the above statements sound perplexing, it is just because you have become so accustomed to what you perceive as reality that you have a difficult time understanding that reality can exist anywhere, any time, any size. The nursery tale by Doctor Seuss, Horton Hears a Who is about an elephant who finds a whole world on a dust speck. Another story example of this; In the movie Men in Black, throughout the movie the writers make a play on words that the "universe is on Orion's belt," which is a very cryptic statement because Orion's belt is just a small grouping of stars in Greek mythology. It wasn't until the end of the movie we find out that Orion is the name of a cat and the universe is contained in a small jewel on the cat's collar (belt). What I call the "Horton hears a Who" theory is just that the universe (our duality) can exist in any size. Any size is relative to an observer anyway. We think that our universe is infinitely large, yet the mathematician and the Physicists at the dance hall (story told previously, see Part II) know that if they take an infinite number of half steps, they will never reach the location they want to move.

Duality can exist anywhere, any time, any size. The wonders of the "Age of Information" have brought the capabilities for an understanding of the metaphysical to every one. Anyone with an Internet connection who can perform a standard Boolean search is capable of finding the information needed to learn about things that were previously only understood by rocket scientists and nuclear physicists. People can find really good information about anything from quantum mechanics, to special and general relativity, or even the origins of the universe.

In trying to decide on the origins, the traditional thinking was to consider back to the dawn of time. Yet, more recent advances look within. In considering "causation" of the universe, the modern metaphysical theorists do not feel the need to look back so far in time and instead look to "causation" in every moment of time. After all, it is just as big of a miracle to have created the first moment of time as it is to have created each moment of time. Until we can understand how this moment came to be, can we then even begin to look to the first moment.

String theory is a model of fundamental physics whose building blocks are one-dimensional extended objects (strings) rather than the zero-dimensional points (particles) that are the basis of the Standard Model of particle physics. For this reason, string theories are able to avoid problems associated with the presence of point-like particles in theories of physics, in particular the problem of defining a sensible quantum theory of gravity. Studies of string theories have revealed that they predict not just strings, but also higher-dimensional objects. String theory strongly suggests the existence of ten or eleven space-time dimensions, as opposed to the ordinary four (x, y and z axes and time).

Just because you find some information on the internet doesn't necessarily make it true . . . does it? One thing all of the physicists dealing with the varied hypotheses for reality from string theory to the WSM (wave structure of Matter), even to Schrödinger's Cat, are that somehow whenever science infinitesimally reaches into the very fabric of the universe, eventually all science must deal with the question of reality and "with reality—reality is something independent of what is experimentally established." Albert Einsteins 1950 letter to Schrödinger.

In the Copenhagen interpretation, for example, a system stops being a superposition of states and becomes either one or the other when an observation takes place. In other words, whenever those people at the particle accelerators try smashing particles together to see what pops out, they find that the laws of physics are fundamentally different for an act of observation than for other situations.

We consider Schrödinger's Cat (that is the imaginary diabolical experiment where the investigator puts a cat in a box with no means of observation and then sets a device in the same box whereby depending upon whether or not a radioactive isotope decays will determine if and when the cat gets blown to bits). Some would interpret the experiment to mean that while the box is closed, the system simultaneously exists in a superposition of the states "decayed nucleus/dead cat" and "undecayed nucleus/living cat", and that only when the box is opened and an observation performed does the wave function collapse into one of the two states. More intuitively, some feel that the "observation" is taken when a particle from the nucleus hits the detector. Recent developments in quantum physics show that measurements of quantum phenomena taken by non-conscious "observers" (such as a wiretap) most definitely alter the quantum state of the phenomena from the point of view of conscious observers reading the wiretap, lending support to this idea.

The bases for all of these seemingly outlandish theories in quantum mechanics to the lay person is that when we try to quantize matter into its smallest building blocks, reality itself somehow seems to fall apart. The problem with all those probability scenarios (Schrödinger's Cat, trees falling in the woods, Thomas Young's double slit experiment, etc) is that observation itself is a quantity of time. Yet, time can only be removed in one of two ways: 1) do not conduct the experiment at all (i.e. no duration, no time) or 2) conduct the experiment forever, or substantially long enough that stability of the outcome has been reached. When we think of existence as space-time rather than just space-matter-energy, we begin to see why there must be some quantum time as well as quantum matter or energy.

It can drive an experimenter crazy when one electron, passing through just one of the slits in Young's double slit experiment, seems to exhibit the self awareness and uncanny intelligence to know something about what the experimenter is doing and how to behave accordingly. Is it merely some kind of a probability scenario where all the electrons or photons undergo random dispersion and reach outcome stability at the speed of light? Whether you take Young's first experiments (1803-1805) or the more modern experiments done even with single electrons, the part of the experiment that makes it a true "quantum" phenomenon is that when you cover one of the holes (slits) the single photon (or electron in the later experiments) seems to somehow know, as if by magic ("spooky" is what Einstein and others called it) when the other slit is either open or closed. That is the spooky action at a distance that has stimulated all of these quirky hypothesis (meta-theories) about why things are the way they are.

Young's double slit experiment truly is an example of a number two type of probability scenario (a quantum moment, or QM) that has reached a stability that could not otherwise exist within our limited logic. In the earlier years, around 1803, of course there were no lasers or electron firing mechanisms. One just blocked all the windows in the room except for just one little hole in one of the window coverings and then put up a screen a few feet away. This was actually called the "photo effect" experiment, where if you looked to the screen you just saw a speck of light. In the one slit scenario, if you looked closer at the light speck on the screen, you would see an exact picture of every thing outside the window and the picture was upside down. This was the "photo effect" that we are all so familiar with, which is the mechanism by which all modern photography works today.

But then Young did something different; he pulled a little divider about the width of a string right in front of the tiny hole in the window covering (in 1803, Young said he used a very small "slip" of a paper card). He also had an assistant with mirrors in order to get direct sunlight to shine in the hole. He then went to the screen to find how that affected the speck of a picture on the screen and couldn't find the light where he expected it. The light picture not only deflected, but there was no upside down picture at all, but instead a bunch of tiny little lines (he called the "fringes").

Just after young first discovered the "double slit" effect on light, it was simply theorized to be nothing more than an interference pattern; some of the light waves from one slit (small hole in a curtain) colliding on the other side of the curtain with the waves from the other slit. The thing was that if there were only one slit, the light would just pass straight through. Young questioned, how did the light from one side of the slits in the window covering know how to exhibit the "interference" (as it was called) when you open or remove the second slit? For some reason the light with two slits both deflected and caused an interference pattern, but if you put the slits far enough away from each other, no interference resulted.

In more recent variations, science has learned to develop single electron firing mechanisms where just one electron or proton can be fired at the curtain. Today we even know that a remarkable result follows from a variation of the double-slit experiment, in which detectors are placed in each of the two slits, in an attempt to determine which slit the photon passes through on its way to the screen. Placing a detector even in just one of the slits results in the disappearance of the interference pattern altogether, and you will simply get the expected photo effect with no deflection and no fringes. If the light behavior wasn't "spooky" enough already, now the single electron even seems to know if we are watching. In other words, the mere observation of trying to determine which slit the single photon passes through will cause a change in the behavior. Is the electron sentient, or is there something else going on here?

Many similar results have been exhibited more recently in the particle accelerators where smashing together extremely small particles also created some strange behaviors depending on whether detectors were placed to observe or not. The amazing thing is that when the mere observation of an experiment can actually change the outcome, this it isn't really an interference problem at all, but a "quantum occurrence."

This arrival of quantum mechanics completely changes our notion of a vacuum. All fields—in particular electromagnetic fields—have fluctuations. In other words at any given moment their actual value varies around a constant, mean value. Even a perfect vacuum at absolute zero has fluctuating fields known as "vacuum fluctuations", the mean energy of which corresponds to half the energy of a photon—also called the Casimir Force, or Casimir Effect. Thus, there is a difference between "real" empty space and "imaginary" empty space.

With all of these breakthroughs in quantum mechanics, we can now go back to better understand Descartes, because now we know that we can actually ascribe some existence to empty space. All this time spent looking for "ether" to explain all the "forces" which can act at a distance, was merely a fallacy. The forces truly are due simply to nature. Non-locality, or duality as we have come to know it, is the natural essence of all existence. Therefore, our reality is in fact a much larger phenomenon than the mere subset duality which is the universe we can experience. If a tree falls in the woods with no observer, it will make a noise in the trees duality. If the cat in Schrödinger's box gets disintegrated, it happens when it happens in that cat's duality, whether we observe or not. And when that single photon travels through both slits in Young's experiment, we are merely observing in our own duality that the outcome stability for the single electron or photon in the double slit experiment is that the probability of the one photon or electron existing in our duality is . . . just a function of which frequency we tune to in our measuring devices.

Bell's theorem is the most famous legacy of the late John Bell and in many ways explains all of this. His theorem is notable for showing that the predictions of quantum mechanics (QM) differ from those of intuition. It is simple and elegant, and touches upon fundamental philosophical issues that relate to modern physics. In its simplest form, Bell's theorem states: No physical theory of local hidden variables can ever reproduce all of the predictions of quantum mechanics. In other words, Bell says that reality itself is indefinable. Like all quantum mechanics, as soon as you begin to break matter down into its smallest particles, you find that there is no "God Particle" but instead you find the equation turns somewhere in-between zero (nothingness) and infinity (indefinable). See The God Particle, Leon Lederman, Dell Publishing, NY (1993). And for all you mathematicians out there, you know that if you take an infinite number and divide it by zero, you simply get a much larger infinite number that is also indefinable. You can't even call that number infinite, because it is not infinite: the number is merely indefinable and Bell tells us that indefinable is the nature of our universe as well. For our purposes, rather than call it "indefinable" we call it the CII ("see-two"), the counter intuitive for the intangible, or the dream within a dream.

This theorem has even been called "the most profound in science" (Stapp, 1975). Bell's seminal 1964 paper was entitled "On the Einstein Podolsky Rosen paradox". The Einstein Podolsky Rosen paradox (EPR paradox) assumes local realism, the intuitive notion that particle attributes have definite values independent of the act of observation and that physical effects have a finite propagation speed. Bell showed that local realism leads to a requirement for certain types of phenomena that are not present in quantum mechanics. This requirement is called Bell's inequality. These well defined properties are often called hidden variables, the properties that Einstein posited when he stated his famous objection to quantum mechanics: "[God] does not play dice."

How do the scientists study this "causation" problem then? The names Alice and Bob are commonly used placeholders for archetypal characters in fields such as cryptography and physics. The names are used for convenience, since explanations such as "Person A wants to send a message to person B" can become difficult to follow, especially in complex systems involving many steps. Following the alphabet, the specific names have evolved into common parlance within these fields—helping technical topics to be explained in a more understandable fashion. Personally, I don't think there is anyway that A & B can solve any these problems; so just for fun, in my version, I prefer to use much older characters (the little eccentric, but much wiser "M & N") or Margaret and Norman.

So now let's consider these particles (physical objects if you will) called Marge and Norm. If you think of M & N as sentient quantum measuring devices, they can be imagined as an entangled pair of particles that have interacted and then separated. But since they are also people, now we can also imagine asking these objects if they would personally agree with the Heisenberg Uncertainty Principle (the notion that observation alone changes the outcome), which is one of the most fundamental concepts in quantum mechanics.

One subtle assumption M & N could make of the Heisenberg Uncertainty Principle could be found in Bell's interpretation. In Bell's inequalities Intangible does become intuitive. That is, that our intuition about reality and the way we perceive the physical reality around us actually steers us away from understanding the nature of duality which is the true essence of our being, which herein we have called this phenomenon the CII, or the counter intuitive for the intangible. The only problem with the CII is that to understand it, you must use volition and faith to be able to grasp the concept and arrive at an intelligent decision that our reality is entirely non-local: i.e. that some being greater than ourselves was responsible for creating our duality. For purposes of the well-being of the creatures inhabiting this duality, a barrier (veil, if you will) was placed there by some Deity (your higher power as you choose to accept it) to purposely shield our ability to observe beyond the CII.

The CII means that there is a GOD, and all the scientific derivation we can perform to test the natural barriers of the CII refer to several objective properties that cannot all be measured for any given particle, since the act of taking the measurement changes the state. Believing in God, however, under local realism, the difficulty is readily overcome . . . so long as we can really assume that God is real. If this assumption is felt to be unjustifiable, though, one can argue that Bell's inequality is unproven. In the Everett many-worlds interpretation, the assumption of counterfactual definiteness is abandoned, where Everett assumed that the universe branches into many different observers, each of whom measures a different observation. Hence many worlds can adhere to both the properties of philosophical realism and the principle of locality and not violate Bell's conditions. Or, perhaps the best explanation for the CII is that both God exists and there are many worlds.

So, having considered the Judeo-Christian ideas of creation in a more modern light, we easily see the creationist and the evolutionist are not even in disagreement. Mankind has continually attempted to answer his questions about the perplexing concepts of human behavior. Humans have studied psychology, psychiatry, and sociology, to name of few of the subjects. But the modern subject of quantum physics is perhaps the greatest leap forward in understanding the origins of the universe than any other subject known to man. Plato, Aristotle, Galelio, Pecurnicus, Descartes, Newton, Planck, Heisenberg, Everett, Bell, Einstein, Bohr, and Hawking are just a few of the humans who have taken this study beyond the scientific qualities of reality, but to the actual quantities of reality (also called quantum physics).

With a firm foundation having been built in the traditional (or religious) thoughts of the metaphysical, we can turn now to those "quantum physicists." You know, all those great minds from Plato to Aristotle, from Einstein to Maxwell, and let's imagine them all sitting in a room. We of course want to begin asking them questions, so we will have a Moderator in the room. But before we do that, let's just take a moment to try to imagine that if they by chance were actually all sitting in a room, what would they be doing and what would they be discussing? Since this is our imagination, we of course want them to be discussing the metaphysical and what it all has to do with our universe and we want them to tell us they way things really are. In our version of this room, with all the great quantum physics minds of all time, let's imagine them playing catch with an object. An object of critical importance to this concept called the "metaphysical."

They are not playing catch with a Frisbee or a ball. No, this is something much more profound. This room is imaginary, so we can imagine what we want, but once we imagine it, we have to stick to only true possibilities of what could actually be included in their conversations. And when they are conversing, we will stick to what things might actually occur in that room.

Instead of handing them some meaningless object, then, we hand them something much more stimulating to them. Something they have never seen before, but that theoretically must be possible, but yet somehow has never existed for them or us except in our imaginary room. Since it is theoretically possible, though, we can still keep all the rules of physics intact.

The thing we hand them is simply a handful of empty space (they are playing catch with a vacuum). In this room, we have handed them this small hand-sized quantity called empty space. And of course this room is furnished with nice comfortable chairs for our heroes to sit back and contemplate what they hold, toss it back and forth from one to the other, and discuss what they are holding and how it is that this thing can be tossed. Really! If you are already having difficulty imagining how a ball of empty space can even be handed to somebody, let me just say it could be. But if you are still having trouble with me telling you it can exist then let's allow those men to discuss this as there first topic. Oh! and by the way, they all speak English in this room. I guess they have those "universal translators" from Star Trek or something. So let's open the door to the room and throw in the empty space. Who is the first to catch it?

MODERATOR: Adam? You are not a physicist. What are you doing in here?

ADAM: I am the first human being to look into the sky and to actually consider my own exisitence. I am. I exist. I am a sentient being because I am aware of my existence. I am a prophet to my children because God has spoken to me. I wanted to reach for the stars and I wanted the perfection of a God, but I found out that it it wasn't mine for the taking. I do not hear God's voice or see him any longer, because I have been driven out into a darker world now to be tested. I know that I was in a beautiful garden where I had found an helpmeet. One day I followed her out of the Garden to a place of duality to taste of the fruit that grew thereof. I did not wish to step out, but I knew that if human kind were ever to be, I had to suffer pain and taste the bitter so that that I could know the sweet. The duality was the right place for my spirit to progress to one day reach for Godhood. This handfull of empty space you have given me; I do not know this thing, yet it seems somehow familiar. I remember the nothingness of the abyss, but this empty space is not the abyss; it is something. It is something different than nothing. It has a volume and dimension even though empty inside. I saw the first Great I am. I saw the worlds he created. And now I know that this empty space I hold is something more than nothing. I don't know what it is. Maybe someone can tell me. To whom shall I give this empty Space?

MODERATOR: You should first, of course, hand it to Aristotle because he is the true father of metaphysics.

ADAM: I don't know any Aristotle. Maybe to my son Seth then?

MODERATOR: No. You must hand it to Aristotle. This discussion really is about that tree of life you spoke of and what drove you into this world. What we want you to discuss today is more than creation, however. This is the creation that happens in every moment of every day. This is what we now call metaphysics or the branch of philosophy that examines the nature of reality, including the relationship between mind and matter, substance and attribute, fact and value. The term "metaphysics" is regarded as having originated from the works of Aristotle. Aristotle was a Greek philosopher, a student of Plato and teacher of Alexander the Great. He wrote on diverse subjects, including physics, metaphysics, poetry (including theater), biology and zoology, logic, rhetoric, politics, government, and ethics. Along with Socrates and Plato, Aristotle was one of the most influential of the ancient Greek philosophers. The editor of his works, Andronicus of Rhodes, placed the books on first philosophy right after another work, Physics, and called these books "ta meta ta physika biblia" or, "the books after the books on physics."

ADAM: Well OK then. Is this Aristotle fellow one of my progeny?

MODERATOR: Oh yes! most certainly. We are all your descendants. All nations kindreds and tongues.

ARISTOTLE: (sounding a bit like a know it all bad Shakespearean actor) Ehmmm! Metaphysics is the knowledge of immaterial being, or of "being" . . . in the highest degree of abstraction.

MODERATOR: Yes Mr. Aristotle, but what about the thing you hold in your hand.

ARISTOTLE: I refuse to comment on this piece of empty space, because you are imaginary to me. This is an imaginary room. And I am simply dreaming.

MODERATOR: But please Mr. Aristotle, what can I say to make you change your mind? Can't you at least tell me what caused this room to be here and why you are holding the thing you are holding?

ARISTOTLE: Ah! yes, causation. Now you have asked the right question. For what causes anything whether real or unreal? Even imaginary things must have causation; else what could have caused us to imagine them? There are exactly four means by which all causality is determined: material causality; formal causality; efficient causality; and final causality. Material is that from which a thing comes into existence as from its parts, constituents, substratum or materials. Formal is determined by the definition, form, pattern, essence, whole, synthesis, or archetype. Efficient is beginning of change or that from which the change or the ending of the change first starts. Final is that for the sake of which a thing exists or is done often called the "but for" causation; but for A (a certain instance) B would not have happened (a certain result). But again, these are just categories of the means to the end. If you really want to understand causality, you must first accept that there are but two alternative modal operations for causality: there are the things that have purpose which is otherwise called "proper causality" referring to those things which happen for an intelligent reason or volition; and there are the things that have no designed purpose, but happen simply by chance or accident. Those of the second order have no intelligent design or volition behind them; they just happen. And I know these these things to be true just like I know that man is superior to woman; things of a heavier mass fall faster than lighter things; the stars are but the smaller burning embers spewn from our sun and are thousands of times closer to us than the sun; and that I am of a superior race meant to rule and reign over the lesser races of human kind.

MODERATOR: But Mr. Aristotle, those things are not true.

ARISTOTLE: You insolent and presumptuous peasant. Be gone with this ghastly thing and return it from whence it came.

MODERATOR: My deepest apologies Mr. Aristotle. Please forgive my rude outburst. Could you please hand it to the gentleman standing next to you and he'll take care of it for you.

JOHN MACKIE: I am still confused at why I am here in the first place. And now I certainly can't understand why Mr. Aristotle would hand this to me.

MODERATOR: Well, first I would need to know what you mean by why? Aristotle handed it to you because I told him to. I guess he might have called that the efficient causation though. And why you are here, is because, well, you are a dead physicist in my duality, so here that makes you an authority. But I ask you; then, what is the final cause of this? In other words, why really did he hand it to you? Was it me telling him to hand it to you or was it him deciding to hand it? Yes it was his action, but would he have even thought to hand it over without my suggestion or request?

JOHN MACKIE: You are merely talking about the usual type of "cause", which in fact, refers to the "INUS" conditions (insufficient and non-redundant parts of unnecessary but sufficient causes). For example; consider the short circuit as a cause of the house burning down. Consider the collection of events, the short circuit, the proximity of flammable material, and the absence of firefighters. Considered together these are unnecessary but sufficient to the house's destruction (since many other collections of events certainly could have destroyed the house). Within this collection; the short circuit is an insufficient but non-redundant part (since the short circuit by itself would not cause the fire, but the fire will not happen without it). So the short circuit is an INUS cause of the house burning down. But this is not the causation that you want to talk about. You want to know if there is a God who causes these things to happen. You see, God is not the cement of the Universe, but rather, causation is itself that cement. Free will is no excuse for the existence of evil and suffering, as God could have given us both free will and moral perfection, thus resulting in us choosing the good in every situation. No! your empty space cannot exist in this imaginary room. You are mistaken about that. I do not know what it is we have here, but I do know that neither you nor God caused it to be here. Therefore, I must agree with Mr. Aristotle and deduce that I am just dreaming and none of this is real. So, I still ask you, why am I here in the first place?

MODERATOR: Of course it isn't real. I've told you, this is an imaginary room. But you are here and it is not me that has imagined you. You are a real person from my history books. Your works have been recorded; your theories been taught; your non-belief in God or Supreme being is matter of record. Maybe you are not imaginary, but in this instant, merely a possibility. If there were a time machine, we could gather all of you up into this room. Yet, there is no such thing as a time machine and you are not really here, but imagined here. Then answer my question; what caused you to be here in this imaginary room, holding this handsized piece of real empty space?

MACKIE: Do not answer my question with a question. Why am I here?

MODERATOR: If you have been listening, that is my question as well. You say that there can be no God, but then what caused you to be here?

MACKIE: Yes. You do insist on telling me that I am here, when I am not. This is imaginary and may I remind you, not my imagination running things here.

MODERATOR: But your INUS really doesn't take us beyond correlation. Let's really look at your insufficient and non-redundant parts of unnecessary but efficient causes by considering that rooster who crows outside my window from the farm next door in the morning; let's call him Rooster. Rooster crows and I wake up. But I only wake up when Rooster crows. And since I was asleep before Rooster crowed, I really don't know that he crowed before I woke. Therefore using your INUS conditions, I can conclude that it was my waking that caused Rooster to crow. And considering further, perhaps it was the Rooster crowing that caused the sun to rise because every time Rooster Crows the sun will rise.

GALELIO: (Galelio interupts, speaking english of course with that heavy Italian accent) Maybe I can be of some assitance here, because you know of course that causality has no place in analytical t'inking. Causality can only be determined empirically by observation. We must a let scientific methodology take over. First we a shoot the Rooster and a then we wait until da' next morning; and a the sun she rises and a then you waked up . . . but a no more Rooster.

MODERATOR: Ah! yes Mr. Galelio Galile. Then causation is only what we believe it to be, but isn't that just a little narcissistic to believe we are the center of the Universe when it comes to causation. Do not effects happen for certain causes whether we believe the cause or not? Mr. Mackie, please hand the ball of empty space over to Mr. Galile.

(Albert Einstein interupts with that strong German accent)

EINSTEIN: According to Descartes, der empty space must haf a container to exist, because existence is a fallacy without extension.

GALELIO: Let us put the empty space inside a shiny metal container, preferably in the shape of a ball.

EINSTEIN: Yah! but if ve make the thickness of the sphere so thin that it is barely there (John Bell chimes in)

BELL: This whole room is imaginary, so we can also imagine the walls of the ball containing the empty space to be so thin that the width of the partition between our imaginary space and the real empty space approaches zero.

(Those of you have ever seen Stephen Hawking on TV, you know that as of the writing of this paper, he is: (1) alive and doesn't belong in this room; but (2) in a wheel chair with one of those gadgets that makes him sound like a robot, so he is truly somewhere in between this world and the singularity)

STEPHEN: Stop this! The thickness of the periphery is zero.

EINSTEIN: Ah! Ve are just throwink around a ball of empty space.

Like our room full of scientists out of some episode of The Twighlight Zone, mankind has also been playing catch with a vacuum; constantly perplexed about the physical nature of the universe. Let's move on here and come back to our room full of scientists a little later.

The Physics of Multiple Mortal Probations

Likewise, mankind has always been perplexed about the physical nature of the universe and has studied math, physics, chemistry, astronomy and other scientific subjects. The paradox arrives because of the theorist's inability to take a leap on faith. There still does not exist a unifying theory for all reality. The next step toward one will most likely be just as absurd as relativity seemed to some in the early twentieth century and quantum physics seemed in the later part of the century. It just seems absurd in the first place, until many people find out that it works. So, if there is a duality, which to us is the reality we ascribe, then how much more can we even seek to understand that which we can only observe, but never exactly quantify?

Let's reconsider our understanding of electrodynamics. Maxwell's equations are the set of four equations, attributed to James Clerk Maxwell, that are most often used describe the behavior of both the electric and magnetic fields, as well as their interactions with matter, and are the foundation for most of electrodynamics as we know it today. It took mankind many years after Maxwell to reach the Lorentz-covariant formulation of Maxwell's equations. But today we have a fairly deep understanding of the electro-magnetic spectrum that the 16th century pioneers in metaphysics did not have. And while that understanding is not the answer to all understanding of the metaphysical, it will help us learn more of the metaphysical universe and perhaps steer us in the right direction to be able to apply certain rules to the non-local idea of duality as discussed above.

Maxwell's four equations express, respectively, how electric charges produce electric fields (Gauss' law), the experimental absence of magnetic monopoles, how currents and changing electric fields produce magnetic fields (the Ampere-Maxwell law), and how changing magnetic fields produce electric fields (Faraday's law of induction). In making sense of Maxwell's and Faraday's equations, mathematicians must use the letter i to describe a thing, which does not exist, and call it the square root of negative one. Imaginary is more than just a mathematical gimmick. Now with the CII having been unraveled, "i" is an integral part of our very existence. Scholarly derived equations for light, electricity, electromagnetic waves, etc., require imaginary numbers for these things of nature to work. It is as if a veil has covered this imaginary place from our detection.

The veil is a place which we cannot go until we have past from this world. Yet it is always around us affecting our very thoughts and actions. Mankind's physical body is at odds with the spirit, yet the capability of bringing the spirit into harmony with the body is within all mankind. For example, religion is at odds with science, but it does not have to be. When Adam and Eve took the fruit from the tree of knowledge they reached into the realm which only Gods can go. They were cast out of the garden. And now fire and cherubim block the way. The world is now a physical place. The metaphysical could no longer be observed, but only speculated upon. God gave Adam and the children of Adam and Eve, a supernatural gift: a gift of alternate mortal probationary states. In any one lifetime, mankind cannot achieve any kind of perfection to move on from his mortal probationary state. But a way has been provided. The number of lives we can live is infinite, but they cannot be imagined as strung out over time. In the metaphysical there is no concept of time. Humankind can only live once, but there are alternate occurrences of that life going on all around the many dualities that exist.

Multiple mortal probations is not inconsistent with Judeo-Christian religions or any other religions. It is consistent with quantum physics. It is consistent with duality. All this has happened before; all this will happen again; and all this is happening right now. All history was happening; all future has yet to happen; and I have and will observe it all happen. But a rock, an apparently real piece of granite, is just a bunch of molecules with not even one molecule taking up any specific amount of space. True singularity and zero points are only theoretical, but in the CII, the theoretical is often more concrete than the physical. Duality needs no quantity. Our quantity is just a perception, but our quality is impossible to break.

When we speak of our very own existence in physicality, we always remain only and just "practically" there; our physical bodies are never really anywhere. So, our duality means that we are actually never really in reality; we only exist in duality, body and spirit. Relativity, on the other hand just gives us a reference frame from which to observe ourselves as a practicality. Duality is that which is the natural and the supernatural and only God can restore that to us, when we are ready to receive it. That will be our paradisiacal glory where we live in reality rather than duality.

Duality might also be at the cause of many religious beliefs and practices. It is pretty easy for us to accept that deity might exist, but like Descartes, once we accept that there is some higher power, we realize that we have no idea how to ascribe some properties of form to deity. Who is God? What does he/she/it look like? And probably more importantly, what does God want us to do?

When thinking of the "creation" we too often forget that every moment of every life is a creation in and of itself. The order of power that was necessary then to bring forth "causation", is what we look for to the heart of our existence. In order to understand causation, again, we turn back to the counter intuitive. As we found in studying Descartes 3rd meditation, "all the perfections conceived of belong to God. But if we owe one causes existence to another cause, then we demand again, for a similar reason, whether this second cause exists of itself or through another being, until, from stage to stage, we at length arrive at an ultimate cause, which will be God." If we look to God then for causation, have we looked to religion for the answer?

Too many times, when we look to our religious traditions, those traditions are taken only for what they are; we forget to consider what those traditions may yet become. What is being suggested here is that instead we need to look to the sciences of the metaphysical and try to understand where those "supernatural" forces really come from and what they really mean for our souls. Then and only then can we turn back to those religious traditions of moral codes, practices, institutions, and rituals to try to understand where they come from and why they are so crucial to human progression.

Remember, as we look to the science of it all, God has still put us in the driver's seat and he is counting on us to steer ourselves through. The work and the glory of God is to bring to pass the immortality and eternal life of man, but what good is immortality if man himself does not have some part in his own development. Just like a parent to a child, God wants us to grow to be His true partners and companions. He knows us, loves us, and wants us to return. Perhaps then it is not "Eternal Life" that is His work, but "Eternal Lives!"

The following appeared in 1845, May and June, editions of the Times and Seasons, a monthly religious publication related to the Mormon movement in Nauvoo, Ill. Communications. Paracletes.

MR. EDITOR-If you think the following sketch of the "Paracletes" worthy of a place, in the Times and Seasons, use it. Once upon a time, the most honorable men of the creations or universes, met together to promote the best interest of the great whole. —The "head" said to his oldest son, you are the rightful heir to all, but you know I have many kingdoms and many mansions, and of course it will need many kings and many priests, to govern them, come you with me in solemn council, and let us and some of the "best" men we have had born in the regions of light, to rule in those kingdoms and set them in order by exhibiting good that evil may be manifest. It was said and done, for every thing there, was adopted from the "head" by common consent. As free agency gave the sons of the "head" a fair chance to choose for themselves, the most noble of the hosts, came forward and selected a world or kingdom, and a time or a season, when he would take his chance, at winning the hearts of the multitude, a kingdom, crown, and never ending glory. The innumerable multiplicity of kingdoms, or spheres for action, with beings and animals in proportion, and time, times, eternity and eternities [eternity's], for a full development of the qualities and powers of each, would so far exceed the common comprehension of mortals, that I can only say eye hath not seen, ear hath not heard, nor hath a natural heart yet been able to calculate either. I then shall content myself, for this time to sketch but one. Idumia is the one as interesting as any, and being situated at an immense distance from the center or "head's" residence, and many eternities [eternity's] from the birth of the "Son of the morning" or even the great holy day when the "morning stars sang together," because so many worlds had been wrought out and left "empty and desolate," as places for "all the sons" of God to multiply and replenish the earth, I select that. Time being divided into seven parts, the following men agreed to leave the mansions of bliss, and spiritually help organize every thing necessary to fill a kingdom for the space of many of the Lord's days, viz: Milauleph, Milbeth, Milgimal, Mildauleth, Milhah, Milvah and Milzah. Now after they had organized the kingdom of Idumia spiritually, then one at a time, was to come temporally and open the door of communication with the spiritual kingdom, that all that would, might return to their former estate; for, for this reason, all the regions created and to be created, were filled with a variety of beings: agents to themselves but accountable to the "head" for promises, made, when they agreed "to go" and be born of the flesh as they had been of the spirit; that they might know the evil, and choose the good: and then be born again of the spirit and the water," and enter into the mansions prepared for them before the foundations of the worlds. Milauleph being the eldest and first chosen for Idumia, came on when 'there was not a man to till the ground," that is, there was not a "man of flesh" to labor temporally; and his elder brethren who had wrought out their salvation, upon worlds or realms, or kingdoms, ages, yea even eternities [eternity's] before, formed him a temporal body like unto their spiritual bodies, and put the life of his spiritual body into it, and gave him the power of endless lives. Now the acts of his spiritual body, while he was a child with his father and mother in heaven; and his acts while he was in the spiritual councils of the Gods for millions of years; —and his acts upon Idumia, while he named, arranged and prepared every thing upon it to fulfil [fulfill] the end and aim of their creation, behold they are written in 'the books' of the 'head,'—which are to be opened when the judgment comes for just men to enter into the joys of a 'third existence' which is spiritual. Milauleph had one thousand years to account for, as well as to be 'arch angel' of Idumia, after he laid down his temporal body. Behold here is wisdom, he that hath ears to hear let him hear, for Milauleph, as yet had not been tempted with evil that he might know the good. He had not exercised the power of endless lives that he might do the works that his father had done: and he had not 'fell that men might be.' Although he had seen his eldest brother create worlds, and people them; and had witnessed the course and conduct of that world and people, as free agents, 'sinning and being sinned against,' while 'death' who held a commission from the 'Son of the morning,' to end the first partnership between the spirit and the body, yet, with all this knowledge, and a liberal education in the great college of the nobles of heaven, wherein all perfection was taught, all science explained from first to last, and all that was, is, or will be, was exhibited on the great map of perpetual systems, and eternal lives, Milauleph had to take his wife or one of the 'Queens of heaven,' and come upon Idumia, and be tempted, overcome, and driven from the presence of his Father, because it had been agreed by the Gods and grand council of heaven, that all the family of the 'head' that would do as he or his eldest son did, should be exalted to the same glory. This was to be accomplished by the power of 'perpetual succession' in eternal lives, wherein there was no 'remission of sin without the shedding of blood;' no forgiveness without repentance; and no glory without perfect submission to the 'head.' The foundation was truth: and the continuation, perpetual succession by revelation. Milauleph, then, knew that he and his wife would sin, and be troubled; but as the eternal spirit in him was the candle of the Lord, he knew also that the light thereof upon the eyes of his understanding, would show some of the way marks to the original 'truth,' whereby he might work out his salvation with fear and trembling. That none of the work of the hands of the 'Son' might be lost or any souls which his father had given him, might be left in prison, angels were commissioned to watch over Idumia, and act as spiritual guides to every soul, 'lest they should fall and dash their feet against a stone.' They were denominated 'the angels of our presence. But I must stop, Mr. Editor: my story of the whole seven who managed the seven dispensations of Idumia, will be too long for one communication. And let me say that I have began this story of the 'Paracletes,' or Holy Ones to counterbalance the foolish novel reading of the present generation. My story is not revelation, but the innuendoes relate to holy transactions, which may lead good people to search after truth and find it. If this meets the approbation of virtuous minds, I shall write more.

Joseph's Speckled Bird. Nauvoo, May—1845 Communications. The Paracletes. Continued.

To continue the history of the seven holy ones, who agreed to take upon them bodies of flesh, and work out a more exceeding and eternal crown of glory, upon Idumia, it will be necessary to premise, that Milauleph, and his first companion in the flesh, knew before they left their "first estate," what their fathers' will was; and that when they should begin to replenish the earth, Satan, who had been raised and educated with them in their father's family, would descend from heaven like lightning to tempt them, that they might know to choose good and reject evil. These two, who had engaged to people Idumia: to subdue it, and to return, having kept the faith once delivered to the chosen seed, were informed, when they agreed to go and labor their hour, that besides the comforter, to bring all things to their remembrance, the angels which attended them on high should attend them below to preserve them from the secret of unforseen [unforeseen] snares of those angels who kept not their first estates, but were left in their sins, to roam from region to region, and in chains of darkness, until the great day of judgment.

It was written in the law of the Lord on high, that they that overcome by obedience, should be made kings and queens, and priests and priestesses to God and his Father, through the atonement of the eldest son, and that natural eyes should not see, nor natural ears hear, neither should the natural heart conceive the great, glorious, and eternal things, honors and blessings, that were then, in the Father's dominions, and mansions, prepared in the beginning for them that kept the faith to the end, and entered triumphantly into their third estates: —the eternal life.

It was also written in the law of the Lord on high, that when the Lord punished men for their sins, he would "punish the hosts of the high ones on high," and the "kings of the earth upon earth,"—that spirit might judge spirit, and flesh judge flesh; for this honor have all the just, and this honor have all the saints.

Having this understanding-Idumia was placed in its space, but was "desolate and empty." and the life organizing power of the Gods, or sons of the "head," moved over the matters and then the land and water separated. And the Gods called "light, and light came," and they went on and organized a world, and created every thing necessary to beautify and adorn it, with life and the power of lives to sustain it, until it should fill the measure of all designed, from a mite to a mammoth; from a man to a God; and Milauleph's and his wife's spirits, clothed in heavenly garments, and learned in eternal wisdom, witnessed the creation, as the spirits of the Gods had witnessed their Father: for even the elder brother could do nothing but what he had seen his Father do in eternities [eternity's] before. Perhaps this subject may excite the curiosity of some as it will lead the mind back among the worlds that have been organized and passed away, —and among the Gods and angels that have attended to execute the laws and decrees of one universe after another, from eternity to eternity, from the beginning till now; and, to increase the curiosity of having this present world pass away with a great noise, when there is no place found for it; —and of having organized a new heaven and a new earth, wherein dwelleth "righteousness;" and as our fathers cannot be perfect without us, nor we without them; and as the man is not without the woman, neither the woman without the man in the Lord, perhaps Milauleph and his wife, as king and queen to God, and all the sons and daughters of the "head" will shout for joy, and the morning stars sing together again, at the "third" entrance of Idumia and sanctified millions!—Who knows?

Joseph's Speckled Bird.

Like Adam who became the companion of the first born who were instructed by God to complete the creation of this world, the parent would not simply allow the child to grow without teaching some lessons of self reliance. Likewise God's Plan may allow for a certain amount of autonomy. So let's look to science then to see where causation begins. Let's take into account Descartes meditation to see if we can understand the source for the natural light required to cause ourselves to exist in this moment, and that same power to yet exist a moment afterward (relight the candle). Since we are merely thinking beings, if such a power resided in us, we should, without doubt, be conscious of it. For no power can bring something from nothing. Each cause must contain within it at least the capability of the creating its effect. So, we now know that we are dependent upon some power of being different from ourselves, as with the light, to turn have turned us on, i.e. created us as thinking beings, much in the same way that someone must light the candle in the cave in order for there to be light. Creation of the universe has no more to do with causation than just any arbitrary quantum moment of time. In other words, in order to understand the spiritual reality (not just the duality in which our bodies reside) we need to stop thinking of the beginning of time as some single occurrence some billions of years ago at the dawn of creation.

The quantum moment is the beginning of time. When we think of causation, we are thinking about a moment in time where linear order has been ascribed where one thing leads to another. But, by definition, we are talking about time. When we thought of objects, we used to think about particles and now we think about the wave properties in those quantum time blocks. If the wave property of matter is correct, then our duality has a specific wavelength, frequency, and cycle. It seems that there is some kind of wave structure, whether it is strings, in-out waves, or even some other phenomenon, time now is a major component of all physical matter. A wave is by definition a function of time. If we start with one second of time and devide it in half, we have one half second. If we divide it again, there is one fourth of a second. And again, and again, and so-on until we have a quantum moment. But at causation, we still haven't arrived. What is causation? Is it time? Is it space? Is it matter?

In considering causation and where it begins at quantum time, perhaps the most easily comprehended model we can use as an example is the inertial system (matter in motion). An inertial system is a spacial displacement and its dimensional attributes are distance and time such as meters per second based on some other arbitrary reference inertial system. Any inertial system without a reference system, therefore, is at rest without extension: meaning, that without a reference frame, any object (inertial system) is at rest in relation to itself. There can be no state of velocity or acceleration without a reference outside the inertial system. Inertia without extension, therefore, is a fallacy. And if inertia without extension is a fallacy, what is the reference frame from which we feel our inertia as gravity each time we wake up in the morning a place our feet on firm ground?

Again, we have proven duality because in order for you to feel the inertia, there must be a reference frame to exist as an extension from which your inertia has taken place. That is that non-locality from where your existence has been projected. Through Newtonian physics we have derived many equations to explain forces and inertia. If you have read this page thus far, you must have some understanding in general physics or else I can't imagine that you would have read this far. But you may have also noticed that I offer you very few equations. Equations unfortunately almost always make too many assumptions, so lets just state those Newtonian laws in plain english, which is the best way to reach an understanding the ramifications of the laws of inertia rather than just looking at the equations:

First law: An object at rest tends to stay in rest and an object in motion tends to stay in motion in a straight line at constant speed unless acted upon by an external, unbalanced force.

Second law: The rate of change of momentum of a body is proportional to the resultant force acting on the body and is in the same direction.

Third law: To every action (force applied) there is an equal and opposite reaction (equal force applied in the opposite direction). Another way of stating Newton's third law, an interaction between two objects, is that, if object A exerts a force on object B, object B will exert the same magnitude force on A, but in the opposite direction.

Then mankind has assigned mathematical equations to those laws and in one equation in particular, we have built this idea of inertial systems coming from the second law, which idea is stated as F=ma, or force equals mass times acceleration. From that second law, people have derived that the energy in an inertial system is only considered by how much force must be applied to change the momentum (inertia) of a body. In other words, how much work does it take to move an object? Basically science has just turned the second law over and looked at it from a different direction. Instead of asking how much force it takes to move the object, they ask how far did your object move when your force was applied to it? We call that "work." Then, the amount of work can just be defined as the force applied times the distance it was moved. Which is only to say that some forces do not accomplish anything; the requirements for causation are not met; or are they? Wasn't the force applied? Wasn't energy expended? Force without work is still very much a real measurable occurrence with all of its causation intact.

For example, you can walk up to your car and push it without releasing the parking brake and it will seem like you have done a lot of work based on the sweat that eventually begins pouring out, but since the car didn't move, you really didn't do any work. It is there that we realize that it isn't any one force that causes work to happen but the total sum of the forces all integrated together. (Integration? oh there's that math again) Now, when you push a car and the brake is off and it does begin to move, then you have caused acceleration and you have done some work. Alas, however, if you don't keep pushing the car, it will still come to a stop because of things like friction: the friction of the tires on the ground; the friction of the wheel bearings on the axles; the friction of the brake rotors lightly rubbing against the shoes; and so on and so forth.

So we all know now that in physics we like to consider only the hypothetical situations where there is no friction. If you can't imagine it right away, just call to mind the time you played "air hockey." You know those little game tables with the many tiny holes on the surface that blow a light current of air up on the little "puck" thing that you bang around. Doesn't the puck seem to move quite easily and fast? That is just because the air current has eliminated most, but not all, of the friction. From considering these frictionless states, we have done experimentation to show that acceleration is just the first derivative of velocity. In other words, velocity is given in distance over time such as meters per second and acceleration is just a first derivative of that velocity because it is how fast the velocity is changing measured in distance over time over time, or meters per second—per second. And the corollary is of course that if you "integrate" the acceleration, you will arrive at the sum results of all the velocities over time. (yes, the basics of calculus that you hated some much in school, really are that simple) So then when we look at the amount of work (force time distance) it took to get something to move, we can also imagine that it would take an equivalent force to then stop it if there were no other forces like friction or other resistance to stop it.

Through that magic of math and looking at the work, we have come up with the idea that the kinetic energy of an inertial system then is equal to ½ $mv^2$ where the m=mass and v=velocity and that could be called the "Newtonian" formula for kinetic energy. In non-math English that simply means that through interpreting Newton's laws of motion, the energy needed to either force an object into motion at a particular velocity or to stop an object already moving at that velocity is equal to one-half the mass times the velocity squared. That is why when talking about the units of energy it always equates to some force and distance such as foot-pounds or horsepower. There are other units like joules or calories, but the units are always comparable to some form of "work."

The only problem I have with the kinetic energy equation is that most of the time, it is not true. Those Newtonian equations do not take "extension" into account. In this context, as explained previously, extension means that any one inertial system only has kinetic energy as it can be related to (or observed by) another inertial system. This is relativity at its heart. Imagine you grew up on a space station, never before having seen the earth and all of a sudden you are traveling many thousands of miles per hour straight at the earth. By your reckoning, as far as you know, it has been your space station that is standing still. To you it looks like it is the earth that is flying towards you, not the other way around. Likewise, when we think of other inertial systems on earth, we must also consider a universal reference from which we derive that all objects have considerable kinetic energies associated with them depending on your reference frame.

The only time it the tradition kinetic energy equation is true is when you consider your standing place on earth to be the proper universal reference frame from which to measure. Your velocity on earth then must be considered zero. The problem is that as we have stated before. You are not standing still. The earth is rotating on its axis; it is rotating about the sun; and the sun is moving hundreds of thousands of meters per second in relation to the nearby stars.

Therefore, the proper inertial system must take extension into account and the proper inertial equation is: KE=½m($v_i$−$v_r$)² (where i=the inertial system and r=the reference system). In newtonian physics the kenetic energy equation was KE=½ $mv^2$. But that assumes we have any idea what "v" is a universal sense. What we are really saying about kinetic energy is that we are not measuring the universal energy of a system, but the energy of one system related to another; in other words the difference in the amount of energy needed to change the velocity of one inertial system to match with another.

Einstein then taught us that the speed of light must also come into the inertial equation, because the speed of light is always constant in any reference frame. Under the general theories of relativity, the kinetic energy without extension is also a fallacy $$\frac{mc^2}{\sqrt{1-\frac{v^2}{c^2}}}$$

is Einstein's equation for the inertial system (raising something to the ½ power is really just another way of saying square root). But before Einstein formulated his equation he still had to derive it without a universal reference frame. Einstein clearly recognized the subject velocity can only be related to the point of reference or reference velocity, but then he normalized it for practical purposes by assuming the observers reference velocity as zero. In the final equation, "v"

was for velocity, but how do you ever know something's velocity in a universal sense (remember the earth is moving, the sun is moving, and the universe itself is moving). Then there was the problem of empty space and whether or not it can even have a velocity.

So unless you believe that your motion is at a stand still on the earth (you are not really standing still) Einstein's final equation then was also not entirely true. Duality suggests that the proper kinetic energy must take extension into account the proper equation for general relativity, which is $$\frac{mc^2}{\sqrt{1-\frac{(v_i-v_r)^2}{c^2}}}$$

(again, i=the inertial system and r=the reference system). This equation is much more similar to and consistent with the Lorentz formulas. With the Einsteinian relativity, this reference velocity idea was simply ignored because it was just assumed that light speed was the great equalizer (the velocity that leads to the Grand Unification of the Universe). But what if things can move faster than the speed of light, but it is just our inability in our own duality to observe things outside our duality. In other words, as discussed in Part III above, things do move faster than light (FTL) it is just that when the difference in any two reference velocities differ by a a velocity greater than 300 million meters per second, they must exist in different dualities. Any two physical objects or material things can only exist in relation to each other when their reference velocities are greater than zero and less than the speed of light. If you force a pair of particles (or several pairs of particles) outside of those reference limits in either direction, the particles phase toward the next spectrum reference in the next duality—and then it is observed as energy until it leaves this duality all together. Of course there are infinite dualities and many of them appear to us as existing together. Reference spectrum velocity is the only reason any two particles (or bodies of particles) can ever observe each other; their reference spectrums overlap. Just like the multiple melodies of music and harmony; they seem to combine as if one symphony because some of the frequency cycles coincide. Any particles or energy waves in this universe whose reference frequencies overlap therefore must also exist together. The idea is very similar to looking at a graph of two sine waves functions with the same amplitude and frequency, but only partially and ever so slightly out of phase. If you measure the volume of the areas under the curves and their juxtaposition, you'll see that most of the curves overlap. And now that we have this deeper understanding about duality, we know that all existence is being projected and comes to us through some sort of wave function be it strings or point waves or other.

Quantum physics is usually only concerned about quantum matter (particles). In metaphysical quantum theory, however, quantum physics must seek to understand the realities of quantum time and quantum motion. Just like we can continually divide matter up into smaller and smaller particles, we can also divide time and motion up into infinitesimally smaller and smaller quantities until we at length arrive at a foundational quantity of time or ultimate cause, which will be both the God particle and the God moment.

Therefore, the true quantum moment occurs as $(v_i-v_r)$ approaches 0. That is that when two objects in relation to each other are traveling at exactly the same velocity or so closely to exactly the same velocity that an equilibrium state has been reached a quantum moment occurs. What a miracle it is then for you to be standing next to any other things save it be even another living being. Not only your velocity but the entire spectrum velocity of each particle that makes up each living cell in your body also has to be so close to their velocity that you are at the near quantum bounds of the entire universe contained in this duality. Your velocities are so close that the miracle of the existence of this duality can take place.

That miracle even exists when a speeding automobile or hypersonic jet airplane seems to "wiz" by. It also must exist for each and every vibration of each and every atom. In a light speed way of thinking that hypersonic jet is just crawling. In other words, we know that there is no such thing as an "exact" distance (recall the physicist and mathematician and the dance hall), but now we know that extension requires that $(v_i-v_r)>0$ even if ever so slightly.

Theoretically, two objects could be moving at the same speed, but speed itself also requires a certain measure of displacement (position). And if there is no "exact" position possible in our duality, then we have the reason for the Heisenberg principle: no particle can directly observe both the position and velocity of any other particle (Marge and Norm). What really happens then when the velocity of one object in relation to another approaches the speed of light, as $(v_i-v_r)$ approaches "c"? Additions of velocity do work from a truly relativistic approach, but as far as we have any possibility of observation, we would have to become the reference frame from which to measure and then we are forbidden from observing it. Anything moving faster than the speed of light for us exists in one of those alternate dualities outside of our duality. Marge only observes Norm, but could not ever possibly to an exact measure obtain his position or velocity. It is just close enough to observe.

The "New" Newtonian Laws of Inertia:

1. An object is at rest only in relation to another object. The difference in momentum of any two objects appearing at rest (in relation to each other) must have a very small non-zero reference volocity in relation to each other. Unless either of the two objects are acted upon by a third object, they will tend to stay in rest in relation to each other. An object in motion in relation to the two objects tends to stay in motion in a straight line at constant speed unless acted upon by yet another external, unbalanced force.

2. The rate of change of a reference momentum is proportional to the resultant force acting on a body and is in the same direction.

3. In order for an interaction to happen between two objects, their reference velocities in relation to each other must be a speed less than the speed of light and greater than zero. That is, if object "A" contacts object "B," object B will exert a force on A with the same magnitude that A will exert a force on B, but the forces will be in the opposite direction to each other.

This knowledge of alternate dualities must then also be applied to us spiritually as we too are beings of matter and light. Our thoughts, our bodies, and our entire existence is also part of this wave structure in duality. Since there are many dualities, then our "souls" if you will, also exist in many dualities. Your life that you are living is made up of many of these dualities, yet you are only aware of one at a time. Time then, as in "one at a time," is the veil which prevents you from seeing more than one duality. We can't just think of these alternate dualities as one life lived after another (such as reincarnation) nor can we think of them as living out simultaneously. Anything outside of our time and space is just that; it is simply outside. Our souls can only exist in "one at a time" but our souls can also be outside of this time.

Your alternate duality is not reincarnated from the history of this duality. Besides, I refuse to believe that my spirit is someone else's spirit. This idea that "we are all one" and we can be the reincarnated spirit of another being, as we learned in Descartes meditations, is repugnant. I think therefore I am. And also therefore, I am not you; you are not me; and I am not the reincarnation of Moses or Thomas Edison. I am me.

I am me in this duality. I am me in alternate dualities. And Moses and Thomas Edison are Moses and Thomas Edison, even though they may have different names and speak different languages in those alternate realities, each person contains a spirit here and that spirit is there. When your body wakes from its sleep it is here and not aware of those alternate dualities. The veil of remembrance is unbreakable.

As living spirits, however, we just can't be aware of more than one duality while conscious with our spirits inhabiting this duality. There are many miracles that we just become accustomed to and accept them as the ordinary way of things. Take for example, the fact that every human being must slip into complete unconsciousness at least once every few hours. When you really stop and think about it, what a convenient construction it must have been for God to design a world where our souls can leave our bodies and leave this duality every few hours. Who knows how many more lives could be lived in an instant when our souls have left the body.

Have you ever experienced that "jerking" awake feeling just as you were nodding off to sleep. "Hypnagogic myoclonic twitch" or "Hypnic jerk" is actually quite common. All of us have them; just some of us remember them better than others. If this has happened to you on more than one occasion, don't worry, you are not alone. Close to 70 percent of all people report this phenomenon just after nodding off, according to a recent study at the Mayo Clinic. Most experts agree that this is a natural part of the sleeping process, much like slower breathing and a reduced heartbeat. The occurrence is well known and has been well documented. However, experts are still not completely sure why the body does this, but the general consensus among researchers is that, as your muscles begin to slack and go into a subconscious state, just as you are falling asleep; your brain senses this relaxation signal and misinterprets it. Some say the body thinks that it is dying; others say the body is just thinking that you are falling down. The brain then sends signals to the muscles in your arms and legs in an attempt to "jerk" you back upright. This misinterpretation that takes place in your brain may also be responsible for the "falling" dreams that accompany the falling sensation.

These "dreams" are not really normal dreams, as they are not produced from R.E.M sleep, but rather more like a daydream or hallucination in response to the body's sensations. The fact is now that we know of Everett's many worlds (alternate dualities) one might question, if our souls can really be completely outside of this time and space when we lose consciousness, how many lives could be lived in that instant. It is like one of those Sci-fi movies where the hero falls into some kind of trance as perceived by all those around him, when in fact for our hero he thinks that he is living an entire life time. He wakes from the trance only to realize that to everyone else, he has only been out for a few seconds. With an understanding of Everett's many worlds' theories, and the concepts of duality herein, you might now consider that each time you experience one of those "hypnic jerks" you could actually be a slipping into one or more of your alternate dualities and then being ripped quickly back. How many of these dualities then could you have lived in just that split second that your soul left the body?

Ah! but then you say, if people can die in one duality yet go on living in others, then whose duality is it that we are living? Am living in my duality, or is it someone else's? Are all these people around me really here at all, or are they just an experience for me? In order to understand how these alternate dualities really work we have to be able to think outside the duality to even begin to comprehend this.

We have to realize that "reality" has infinite dualities. And each duality has infinite space and time. Let's take this duality right here right now where I have typed these words and you are reading this webpage. In this duality, the world began millions of years ago out of primordial silt. The earth was formed; dinosaurs roamed the land; the ice age came; man eventually inhabited the earth; the industrial revolution came; I was born; you were born; all these things have happened. Yet there are many more dualities that happened similarly. There are many more dualities where it is nothing like this. Yet, our paths in this one have crossed. In some dualities, it is your son, nephew, or cousin who has a physical disability; in another duality, he doesn't. In some dualities it is you with the physical disabilities. Can't you see now how it is that the weak shall be strong and the meek shall inherit the earth. Even in infinity, there are still proportions.

If in greater numbers of the alternate dualities you experience physical disabilities, imagine how much more humility your spirit is capable of in those dualities where you do not experience those disabilities. And why do we sleep at night? When you are dreaming, could those things actually be real in another alternate duality? Dreams can seem extremely real, but dreams are on the fringes, in the borders of your spirit transfer, which is out of the body and into another alternate duality. Those dreams are not actually in the alternate duality, but so close that sometimes when leaving or returning from the "multi-verse" your mind is rehearsing the glimpses of where it has been and trying to remember.

Multi-verse memory, however, is supposed to be impossible. That is the veil that was placed there, at least in this duality. If there is to be a multi-verse memory, it will come from the other direction, i.e. pushed into your consciousness here from a specific duality where your spirit has that capability. But if you stop and think about it, your spirit pushing a multi-verse memory into your mind in this duality is very unlikely. It is more likely that you have actually chosen this existence in this duality in the interest of your own spiritual progression. But then if it is possible for your spirit to push "multi-verse memory" into your dreaming state in this duality. Couldn't you then push "multi-verse memory" from this duality to another? This idea of you being in a probationary state in this duality by choice is a far more likely scenario than you being here by happenstance or otherwise force to be here. After all suicide is always an alternative, yet many of us choose to "fight the good fight" no matter how difficult or depressing life becomes.

Your adversity is for a purpose, which is to your eternal development and salvation. The gift is being able to influence other dualities and the hope that your spirit in those other dualities is able to influence your duality here, is the hope we must cling to. That is our faith and hope that we learn about in almost any religion. How important then, it is that your duality here has good moral codes, practices, values, institutions, and rituals. Would you like to have all those other dualities pushing their deranged and evil ideas into your heart and head? Do you think you will be helping the progression of your spirit towards communion with God by pushing evil and deranged ideas into other alternate dualities? And what if this duality is the best you get? What if this duality represents your best shot for communion with God? Duality is not in conflict with religion; faith and religion are necessary for your eternal salvation. No matter how flawed or corrupt those religions become, it is your immortal soul that needs to find its own moral compass somewhere and the rules are simply not clear. So, why not adopt somebody's rules and actually live them.

Learn obedience even if you are obeying something you don't quite understand. In obedience, you are still obeying. The stronger your spirit becomes in this obedience in this duality, the more likely the integration of the goodness of your entire spirit in all of its dualities will spark some true progression in seeking the one we call God.

Intelligence Created

Now we have journeyed toward a concept of individual reality. We have made this almost absurd and insane leap of faith to arrive at some strange conclusion that my reality may in fact be something very different from yours. And now even though the above logic makes some sense, it leaves us with an unreal/non-virtual conundrum: how can my reality be different from yours and yet we both exist in this same universe sharing our existence in this same world? We can see why none of it can possibly make any sense without returning to our non-local or wave structure of matter and energy theories to see why our reality is like a radio frequency fading in and out for some observers, yet overlapping and augmenting our reception (and perceptions) of this reality from others.

We can begin to conceptualize the interactions that one molecule has on another by thinking of what happens inside a microwave oven. Why does bombarding matter with relatively higher voltage of microwave energy cause the molecules to vibrate and heat up? The answer is that the bombarding is accomplished using a variable voltage current which is cyclic, meaning in changes between positive and negative charge on a frequency around 2500 cycles per second and during any one of those cycles, the molecules actually change their direction (polarity) twice—once for the positive half-cycle and once for the negative half-cycle. This red-hot rate of vibration causes tremendous friction within the food, and—just as rubbing your hands together makes them warm—this friction produces heat.

We all know that friction causes heat, but why the energy is released as heat during this process is perhaps a question on an even more fundamental level. Who could have said that heat is released? Why doesn't friction cause energy to be sucked up? Why doesn't it cause say disintegration? Or why doesn't friction cause more matter to appear? What we are getting at here is that the very basic rules of physics just are what they are. If we step outside our reality, who is to say anything would make more or less sense than something else?

So, why does friction cause heat energy? It is because where all matter and energy—all existence for that matter—is made up of a non-local projection which also comes in cycles, or frequency. The disruption of that frequency by bombarding it causes it to be pushed in a direction out of duality towards and back into the non-local (or alternate duality) from whence it comes. But matter and energy can neither be created of destroyed in this duality. In other words, there is some resistance to passing into another dimension.

The universe is a symphony of its elements so far as each molecule is in some harmony with all the others. In other words the one molecule of methane gas on Jupiter is somehow in some form of phase and frequency relationship to you in order for you to perceive Jupiter. That is if you take the time to look at it in your telescope. Right now, Jupiter does not have to be in phase with you because you are not looking at it, but when you do look at it; your wave form of reality must be able to harmonize with Jupiter.

So, as we speak of the alternate dualities, there still has to be some concrete reality for this world and all the planets of our solar system and including all the galaxies and for all that we can observe. Descartes taught me that when I see people down on the street outside my window, I know that they are "really" there and not just figment of my own private world or imagination. Despite the fact that my duality differs from theirs does not mean that they are not real or that my duality is not somehow connected to theirs.

If we fully try to comprehend a wave structure of all matter and energy, be it strings, standing point waves, or really any cyclic phenomenon, we are then able to choose to assign to reality that our duality is still nothing more than a projection; a projection from a different plane. Yet, that projection we observe must be congruous with the fact that other souls do exist. For that matter, if you were to take Heisenberg's principle to the fullest, even our own molecules of our own bodies could not interrelate to one another because locality would be nonexistent. Instead, we must consider that our dualities or even each molecule of our bodies in our dualities must still overlap with other dualities. It is only on the fringes of our dualities that diverge from other dualities. This is how quantum entanglement allows our dualities to coincide with others realities. The answer to Schrödinger's cat experiment is that the cat is the observer and not the other way around. The cat is disintegrated when the isotope decays. It is just not observed until you the outside observer opens the box and therefore the cat in the box is not part of your duality until you open the box. Yet, the cat has been a part of infinite dualities within the box and shall become more dualities as the box is opened.

As observers in this world, we do have our own reality, yet as soon as we observe something, our realities do in fact collide (our fringes become focused into one picture). Just like the beautiful harmonies of a symphony, when we learn to love, our dualities become entwined and can be carried on to other dualities and eventually into some reality which is what we hope for. And now our moderator must return to the room full of physicists because if causality can only be found empirically then nothing is true in this duality unless we perceive it. Our quantum theories would then lead to the conclusion that we could make anything happen by just believing it so. Unfortunately, I've tried that and it doesn't work. No matter how hard I concentrate on something, I can't cause it to move or change without physically touching it. Mr. Moderator, please take us back to play some more catch with the vacuum.

MODERATOR: Ah yes. Where were we? We were talking precisely about your current topic. Mr. Galile had assured us that all causation is only what we empirically determine it to be. But now I am left wondering do I really control my own universe? And if I am in control, why can't my thoughts become pure action without physical intervention?

HUME: (David Hume, Scottish Philosopher, April 1711-August 1776, he sounds a bit like Shrek)

Although we do perceive the one event following the other, we do not observe any necessary connection between the two. And according to this skeptical epistemology, we can trust only the knowledge that we acquire from our perceptions.

MODERATOR: Why can't we trust our imaginations?

HUME: Ideas differ from impressions only by being less lively, and all ideas are copied from impressions. If a philosophical term is employed without any meaning . . . we need but enquire, from what impression is that supposed idea derived?"

(Remember the know-it-all who sounded like a bad Shakespearean Actor. Now he interupts loudly)

ARISTOTLE: A desire!

MODERATOR: What? I thought you wanted nothing to do with this conversation. We had all but counted you out. You called me an insolent and presumptuous peasant.

ARISTOTLE: But even though you are imaginary, recall I told you that if you really want to understand causality, you must first accept that there are but two alternative modal operations for causality: there are the things that have purpose which is otherwise called "proper causality" referring to those things which happen for an intelligent reason or volition; and there are the things that have no designed purpose, but happen simply by chance or accident.

MODERATOR: Come to think of it, I was pretty rude to you. Your thoughts about superior races and gravity really were just standard notions in your time. I'm sure all in this room agree that to some extent we are just products of our environment.

ARISTOTLE: Precisely. While I departed the conversation previously, however, I had the strangest opportunity to contemplate something called "duality." I don't know where it came from, but it all seems to make sense to me now. There is the physical side of causality where the sum of all probabilities determines the outcome which is the "improper causality" otherwise known as determinism. Then there are the spiritual components to causation where volition and purpose continually guide the outcome of the many variables, which is called the "proper causation" otherwise known as free-will.

MODERATOR: We are so glad to have you back Mr. Aristotle. Please forgive my rudeness previously.

ARISTOTLE: No offense taken my young and foolish friend.

MODERATOR: Thank you . . . I think.

ARISTOTLE: You're most welcome. Anyone can be taught to lie. The trick is to learn to want to tell the truth. If you are looking for a miracle in your life, what you are really seeking after are those moments where life's duality exposes itself. But these are all "micro" moments. Look for those "macro" moments in your life. Those things reality cannot explain, but only in duality can the occurrence make any sense at all. Perfect wisdom is unplanned.

Belief Computing Devoid of Life?

Arriving at the end now, the above text of the application will most certainly appear to many as the mere tortured musings of just one derelict meta-physicist. When in fact, these concepts are the description and keys to understanding, making, and using the algorithm spoken of, which ultimately is the teaching of machines to make choices rather than just calculations. Most AI (artificial intelligence) programmers in the "narrow fields" have adopted (instead of belief) fuzzy logic as a tool in programming with limited results in emulating human intelligence. But fuzzy logic really isn't the answer to the belief algorithm; it really is only a weak substitute, i.e you just allow the computer to guess a lot. That is not a belief algorithm it is the lying algorithm! You get the computer to treat something as true when it really doesn't know. The better and more humanistic computation would be to treat it as something believed or doubted and then let the computer work toward the answer (a subtle, but huge difference).

So now, with a thorough understanding of life and what it means to exist and to be alive, the reader of this application is now prepared to understand the differences between uncertain computing (Bayesian probabilistic belief networks) and true belief computing. Bayesian networks can make the computer "smarter" and more accurate, but they can't help the computer make a choice. The usefulness of belief computing then is that every decision or knowledge fact that a traditional belief (Bayesian) network is capable of delivering can also be processed with the present invention not consisting of any probability, but consisting of a true choice. Belief computing will always make a choice whether or not any probabilities are ever computed, beginning from a position of trust, but then the learning is hedged by using the probabilities.

Thus, at the most fundamental level, the belief program will never answer a question with an answer that is not believed, unless of course another brain programming function takes place, where the brain is going to going to make another calculation to determine whether it wants to guess about an answer it doesn't really know or that it is willing to outright deceive the questioner with a deliberately false answer. (That is to say a guess to an answer that is provided as a truth is really just as much a deliberate lie as a presenting a statement contrary to the known truth). But even a lie is based on a belief; it is base on a belief that the outcome of telling the lie is superior to telling the truth, but as to the fact, it is still believed or doubted by the program.

Usually the belief portion of the human program is not very evident (even to ourselves) and we just don't notice it, even though it is actually always present in the thought process.

Take for example, the name question again, and if there was some imminent danger of speaking your own name out loud, it would be the danger to cause a belief related calculation where the brain would determine that it was unsafe to answer truthfully. When things aren't imminently dangerous, you will just answer perhaps completely unaware that any of the numerous possible belief calculations were even made. Normally the "belief" question isn't so specific, but it is just as simple as, "is there any reason at all not to answer this question truthfully?" 99% of the time this answer comes back that it is just ok to tell the truth (unless of course you are a habitual liar).

So the belief algorithm then is the other calculation that has to be added to all computer calculations, like the Bayesian networks, if we are ever to be able to emulate human thought. Humans don't use fuzzy logic much at all, if any. On occasion, if we're ever asked to guess something, or to randomly pick among a set of choices where fuzzy logic allows the brain to do its magic ("eenee, meenee, minee, moe"), then the probabilistic belief networks are allowed to do there work without interference from true belief. But when we have already computed the "I don't know" answer in those cases, the response still remains only a guess; the belief lies in the desire, or choice to even answer.

There's no point in "fuzzying" up our decisions. Belief on the other hand isn't random or fuzzy at all; it is an absolutely rock solid computation with a standard true false answer every time; yes I believe or no I don't. Then based on all the other caution calculations your brain comes up with, an action is chosen. A belief algorithm programmer might see choice preceding the belief, but in actuality the belief always precedes the choice. I'll explain:

Pick a number between 1 and 10. No. I really mean it; go ahead right now and pick a number right now in your head. Now, let's analyze what really happened. But, we will still have to cut through all the layers to really understand the process fully. You may think that you just made the choice and it was that simple. But belief, definitely had to come into play, or it would have been impossible for you to really choose a number. Sure, a randomization algorithm could be run to get a number, but hopefully I can show you how a randomization algorithm in no way actually simulates choice. Only a belief algorithm can return actual "choice."

So, when I asked you to pick a number between 1 and 10, your first mental process should be one actually related to the question (you of course have many other parallel processing thoughts going on all the time like what's this guy trying to do here, did I remember my laundry, boy I'm getting hungry, etc.) But, your first truly belief related mental process should have been some sort of classification; your brain inputs the variables 1 and 10. It actually doesn't compute anything at this point, because all it needs are the boundaries for between 1 and 10.

I have often had people actually pick 1 or 10 in response to that particular question, but if we really stop and think about the actual calculation, we would know that 1 and 10 are not between 1 and 10, only 2 through 9 are actually in between, so we know there really was no calculation at that point. None-the-less this illustrates my point well, that in choosing a number, we do not actually perform any calculation, we just set the boundary limits.

Our brain then roles its imaginary die, spins its imaginary wheels, or shuffles its imaginary deck and comes up with a number. Then our brain has its very first calculation: is the number I have chosen actually between 1 and 10? Wherein, comes the belief part. Is it the number I want? Is it a number that the other person will not guess? Do I believe that it is alright to say it out loud?

The beauty about the belief algorithm is that no calculation actually has to be made. The usual conditional check is usually much broader subject for the brain. All that merely takes place is that the brain performs the "is there any reason test." Meaning, are there "any reasons" at all that would prevent me from using the random answer the card shuffler in my brain came up with?" The "is there any reason test" of course is something that can never be answered with certainty. There are an infinite number of brain calculations that would have to be made in order to get the complete answer . . . . Are there invaders from mars attacking right now? Do I have the time to actually pick a number? Do I have any allergies, to picking certain numbers?" Do the tenants of my religion allow me to pick certain numbers? Again, Laplace's Demon presents itself to destroy free agency.

Yes these are all wild calculations that our brains never actually make, but all of them, even if very remote, would still be valid considerations needed for an answer beyond all reasonable probabilities. "The central aim of many empirical studies in the physical, behavioral, social, and biological sciences is the elucidation of [the] cause-effect relationships among variables." *Theoretical Aspects Of Rationality And Knowledge Archive*, Proceedings of the 6th conference on Theoretical aspects of rationality and knowledge, Judea Pearl, 1996.

But when the task of understanding is too difficult, the mind will always make its first iteration based solely on trust (faith). So, immediately with that first iteration, our brain runs the belief algorithm (that thing AI programmers should be grasping for). It is an internal algorithm; the hope versus despair algorithm; Light versus Dark algorithm . . . good versus evil algorithm. It is the "is there any reason test," but the infinite number of reasons never have to be considered. The mind turns instead turns to self image and weighs out the question, do I like myself better with belief or better with doubt? Since nothing else is there to consider, it makes a choice. Then based on those choices and any future outcomes, the belief algorithm becomes more and more sophisticated.

The belief algorithm then is really the; do I like myself test—also called the self preservation test. It is the "do I measure up to my own standards test." Lying is wrong and telling the truth is right, but a lie with real purpose in getting a gain for ourselves may just bring us over to the other side. A computer on the other hand, if asked to pick a number, will always do a much better job at the randomization part of that task, but with current programming parameters, could never actually choose. To get computers to actually choose, we must be able to put the belief algorithm into the mix. Sure, the computer spins its wheels, shuffles it cards, roles its dice . . . just like a human (even superior to a human). But then, when the computer gets its randomization in place, does it stop to ask itself, "Do I like the number my randomization algorithm came up with? Should I run the randomization again? Should I look for some other strategy in this game of guessing a number, or just go with my first instinct?" Just because the "is there any reason at all" test can't always be figured completely, the answer is still calculated each time.

The true belief program by itself is incapable of computing anything; it is merely a method of calculating cyclic error check values. As described above, the program must be assigned an initial machine personality tendency, which in this embodiment uses the belief/confidence array: 1/0=naïve; 0/1=Skeptic; 0/0=timid; and 1/1=arrogant. If prior relationships exist from memory, then confidence may be set to 1 or 0.

The following embodiment contains less than 300 lines of code (excluding remarks) and is a most unsophisticated command line program illustrating how any PC computer running an XP or above operating system can perform a most basic belief check sum on a selected type of input data. It uses no Bayesian network, but instead it substitutes game rules for probabilities:

The Artifices of Knowledge
(Free Will, the Grand Illusion, and the Keys to the Kingdom)

The above algorithm mimics free will because it will act on belief even if that belief is not well formed or even sophisticated enough to be considered intelligent. Free will must begin with the assumption that no fact can be considered pure knowledge because as this application teaches, facts are fleeting and absolute knowledge is only a form of arrogance. The above program is a simplistic but effective embodiment illustrating how a choice to believe in something can be made without computational computing, and in this case, through the steering of user input to the demands of the program.

This embodiment of the algorithm ends when the command line closes. In other embodiments, the program runs in a similar fashion, but instead allows input to any number of questions, stores its data (answers to questions) and parses according to user, topic, time, date, or any number of hierarchical constructs as desired. In this way multiples of the above command line prompt can begin to extract and load data between heterogeneous data stores. Well known data parsing methods may be used, which incorporate a variety of standard and custom data types. In the data flow, the program may make a "call" on any other data source, rely on user input, or even rely on previous iterations of the same running program. Thus, any new data can be used to reinitiate new check values after a pause within the internal program. The external parsing routines can be the source of a new check value to again actuate additional cascades of extracting data, parsing data, and converting data into a data type or other hierarchical framework.

The above command line routine is only an example of three discrete data types, namely the answers to 3 very specific questions: i.e. "name," "music," and "income" of the user. This construct demands very user specific input and controls the user through predetermined discrete input request, which we will call pre-parsed data. In other words, this short example command line program dynamically grows through consecutive inputs on a plurality of data types where one of ordinary skill in the art could easily surmise additional data types and parsing routines. Each data type or subsequent transformation may parse new or external data to convert it to a different hierarchical data type, or to create column copies with different data types. Expressions used in contemporary components may also cast arguments and operands to the different possible data types.

Finally, when any data from the many instances of data types that could be substituted into the above frame work are loaded into a data store and that data store may be parsed to convert it to other data types that the destination program uses. In this manner, the present invention does not itself perform any computational computing, but only performs a belief. The belief therefore is the key to any general computer intelligence rather than just the so-called "narrow field" or strictly "computational" intelligence.

All input data into this program must come with some degree of error. All data being slightly in error, even if ever so slim, is in the embodiment above, and can be fit into many other predetermined discrete error boundaries by having the machine itself only request certain types of specific data input. When the machine ultimately establishes its confidence level check sum, that check sum remains constant until there is a change in the data input state, such as input of new user data or other data sets of similar boundaries become incorporated into the matrix.

In other embodiments, the machine can accept a wide variety of data types and will attempt to "parse" or categorize them into specific and discrete error boundaries and this form of characterizing, categorizing or stratifying data input is well known in the industry. When the same belief algorithms as used in the above simple command line are incorporated into the more sophisticated computational belief networks, a true computer implemented choice occurs, which mimics some or most of the attributes of an intelligent and sapient being. Perhaps having arrived now at the embodiment's portion of this application, a reader might begin to question the reasoning behind this long specification or the efficacies of even having delved into an entire treatise on the metaphysical universe simply to explain a computer program that only computes beliefs and not facts. However, all of this discussion of the metaphysical merely to arrive at a description of how to make and use the invention to those of ordinary skill in the art who have ever fathomed the possibilities of artificial life forms, there can be no mistake that an entire understanding of the universe is essential. Certainly, coming up with a definition for what we mean when we say "life form" has become somewhat of a moving target over the years. Are we alive? Is a virus alive? Maybe a computer can also be alive, but can it be sentient?

Arriving now at this "Grand" question, the ultimate question, of what is reality; this application, therefore, redefines sentience as the ability to have faith. But hopefully one of ordinary skill in the art will also appreciate now why any sentient programming must also incorporate all of the secrets of the universe. And next, probably most importantly, the program must also assume that our own reality itself is in fact one big program. And let us pause ourselves here for a minute because, this idea that life itself is a simulation is nothing new, but has previously only been posited by poets and philosophers. For "Life's but a walking shadow . . . it is a tale told by an idiot, full of sound and fury, signifying nothing."*William Shakespeare, MacBeth, Act V Scene* 5. "If real is what you can feel, smell, taste and see, then 'real' is simply electrical signals interpreted by your brain." *Wachowski, Andy and Larry, The Matrix, Warner Bros., Village Road Show Pictures* (1999). In other words, for a computer programmer to contemplate that we too live in a simulated reality, he must divest himself from classic programming logic (to quote Dennis DeYoung of the rock band Styx, "Welcome to the grand illusion. Come on in and see what's happening.")

The belief algorithms described herein deviate from the formal manner of the traditional propositional logic because by definition both this world and any computer program running in this world are both already simulations. And we know that a simulation does not have to follow classical logic because it exists only in virtual realms; i.e. a virtual world is an imaginary world where the laws of any other world may or may not apply. Therefore, the belief algorithm described herein can successfully ignore both the excluded middle and the law of non-contradiction.

For example, we know that a simulated (or virtual reality) role playing game on the internet is an imaginary world. Yet, we also accept it as a simulated reality. Next, if then using the entire above treatise on the metaphysical world to arrive at the simple conclusion that our own human realities are also a simulation, then our programmed simulation is not virtual, but actually a non-virtual representation of what we assume to be the real world. Because of our classical idea of reality (rather than a non-local reflection of someone's or something's programmed simulation) classical logic has been most intensively studied and most widely used. Non-classical logic, on the other hand typically excludes one or more of the following:

1. Law of noncontradiction;
2. Law of the excluded middle;
3. Double negative elimination Aristotle introduced this idea of syllogism, which is a restricted form of judgments logic where assertions take one of four forms:

| Direct Statement | $p \rightarrow q$ | (If p, then q.) |
| Converse | $q \rightarrow p$ | (If q, then p.) |
| Inverse | $\sim p \rightarrow \sim q$ | (If not p, then not q.) |
| Contrapositive | $\sim q \rightarrow \sim p$ | (If not q, then not p.) |

At least one of the following, then, must exist in any of the above logic scenarios: all Ps are Q, some Ps are Q, no Ps are Q, or some Ps are not Q. But in the virtual-virtual world (i.e. the simulated simulation of the non-virtual) both the Ps and the not Ps are virtual. Whereas the Qs and the not Qs are simply the non-virtual consequences rather than the virtual consequences. Therefore, in the simulated simulation, these judgments can find themselves whether an operator of the result of itself or the negation of the other. Aristotle actually summarized this effect with his square of oppositions rules but then could not find an explanation for why his reality, complete with all his laws of physics as he understood them, could possibly remain constant within his own realms of existence without the law of the excluded middle and law of non-contradiction. In justifying his system, although these laws cannot be expressed as judgments within the syllogistic framework, Aristotle could only express judgments within the real world frame work. Now with the advent of virtual realities, they can be expressed as judgments within the programmed reality framework.

Since the belief algorithm described herein excludes all three of the classical logic paradigms, it can then (at least for discussion purposes) be considered a form of "non-classical" logic. Certainly, even the mere idea that reality itself could possibly be nothing more than a simulation, could easily be considered a new (neoclassical) and useful form of non-classical thought.

What is claimed is:

1. A non-classical method of suspending a logic gate comprising:
   treating all discrete input and output data as error;
   simulating said error as belief with at least one check value or simulating said error as doubt with at least one check value;
   acting on said simulating;
   registering said check value of said belief or doubt as a temporary state subject to the results of said acting and subject to the results of any previous or subsequent data input or output; and
   suspending said logic gate while awaiting said previous or subsequent data input or output.

2. The method of claim 1 wherein said treating all discrete input and output data as error, further comprises:
   parsing input data into specific categories;
   storing said input data as non-verified; and
   storing said output data as non-verified.

3. The method of claim 1 wherein the simulating further comprises a calling of a program routine which assigns a check value.

4. The method of claim 1 wherein the registering further comprises the writing of a binary state.

5. The method of suspending a logic gate of claim 1 wherein the registering further comprises the writing of a ternary state.

6. A method of pausing cyclic data error check values comprising the steps of:
   registering an initial machine personality tendency of at least a single check value;
   treating all input data as error;
   parsing said input data error into discrete error boundaries;
   assigning said initial machine tendency to said parsing of said input data using at least a single check value;
   registering a belief level using at least one check value for said parsing of input data within said discrete error boundaries;
   comparing said belief level with said initial machine tendancy;
   registering a trust level based on said comparing using at least a single check value;
   correlating said parsed input data according to trust level check value;
   calling a confidence level check value based on said correlation; and
   cascading and accordingly pausing said belief level into a cyclic check sum according to said initial machine tendency, said belief level, said trust level, and said confidence level as a perpetually unresolved check level status.

7. The method of claim 6 wherein said confidence level as a state can be affected by new input data.

8. The method of claim 7 wherein said affected confidence level triggers a new instance of said cascading causing a change or recalculation of said cyclic check sum.

9. The method of claim 6 wherein the steps of claim 5 occur in different order.

10. The method of claim 6 wherein said parsing of said input data into discrete error boundaries is predetermined by the program allowing only specific input data.

11. The method of claim 6 wherein said parsing of said input data into discrete boundaries allows parsing of external user or sensory input categories.

12. The method of claim 6 wherein said parsing of said input data into discrete error boundaries is determined through a hierarchical selection.

13. A method of terminating computerized cyclic combinatorial explosions in probabilities computations, comprising:
   treating all world data as error;
   accepting limited data input as error;
   parsing said limited data input into discrete error categories;
   a first registering of one or more initial machine tendencies of said parsed limited data input wherein the said first registry is a beginning personality state for belief/confidence variables comprising one or more check values for belief/no-confidence, no-belief/confidence, no-belief/no-confidence, or belief/confidence;
   a second registering of one or more check values of probabilities for said parsed limited data input wherein said probabilities comprise a computation for probable or not-probable as to said parsed limited data input;
   a third registering of one or more check values for confidence level wherein said confidence level comprises a computed check sum for confident or not-confident as to said limited data input;
   pausing said second registry wherein said third registry check sum resets said second registry; and
   terminating said parsing limited data input, if pending recomputation of said third registry does not result in a changed state to any said registry.

14. The method in claim 13 wherein said second registry is incorporated as a binary, ternary, or quaternary check value for said first registry.

15. The method in claim 14 wherein the arities of binary, ternary, and quaternary elements are expressed as multiples with reference to the number of operations.

16. The method in claim 15 wherein said arities greater than 4 are encountered based on the number of operations.

17. The method in claim 15 wherein said arities is a matter of using other practical computer programming conventions.

18. The method of claim 13 wherein said check sum for confident or not-confident as to said limited data input comprises a check sum for said limited data input as registered through said first data registry.

19. The method of claim 13 wherein said check sum for confident or not-confident as to said limited data input comprises a check sum for said limited data input as registered through said second data registry.

20. The method of claim 13 wherein said check sum for confident or not-confident as to said limited data input comprises a check sum for said limited data input as registered through said first data registry and said second data registry.

21. The method of claim 13 wherein any said registry further comprises a calling of a program routine which assigns a check value.

* * * * *